US012632340B2

(12) United States Patent
George et al.

(10) Patent No.: US 12,632,340 B2
(45) Date of Patent: **\*May 19, 2026**

(54) OBJECT STORE DATA MANAGEMENT CONTAINER WITH INTEGRATED SNAPSHOT DIFFERENCE INTERFACE FOR CATALOGING SNAPSHOTS WHILE RESIDENT IN OBJECT STORE

(71) Applicant: NetApp, Inc., San Jose, CA (US)

(72) Inventors: Tijin George, San Jose, CA (US); Sharankumar Yelheri, Santa Clara, CA (US)

(73) Assignee: NetApp, Inc., San Jose, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/800,181

(22) Filed: Aug. 12, 2024

(65) Prior Publication Data

US 2024/0403168 A1     Dec. 5, 2024

Related U.S. Application Data

(63) Continuation of application No. 18/193,825, filed on Mar. 31, 2023, now Pat. No. 12,061,525.
(Continued)

(51) Int. Cl.
*G06F 11/14*          (2026.01)
*G06F 11/1446*       (2026.01)
(Continued)

(52) U.S. Cl.
CPC ...... *G06F 11/1451* (2013.01); *G06F 11/1469* (2013.01); *G06F 11/1471* (2013.01);
(Continued)

(58) Field of Classification Search
None
See application file for complete search history.

(56) References Cited

U.S. PATENT DOCUMENTS 9,612,910 B2    4/2017  Kulkarni et al.
10,620,866 B1   4/2020  Kumar et al.
(Continued)

FOREIGN PATENT DOCUMENTS

CN        105677516 A      6/2016
CN        105677516 B      11/2019

OTHER PUBLICATIONS

Notice of Allowance mailed on Nov. 14, 2024 for U.S. Appl. No. 18/193,838, filed Mar. 31, 2023, 10 pages.
(Continued)

*Primary Examiner* — Brian R Peugh
(74) *Attorney, Agent, or Firm* — Cooper Legal Group LLC

(57)          ABSTRACT
Techniques are provided for a snapshot difference interface integrated into an object store data management container. The snapshot difference interface is capable of interpreting an object format and snapshot file system format of snapshots backed up to an object store within objects formatted according to the object format. The snapshot difference interface can identify differences between snapshots, such as files that changed between the snapshots, while the snapshots are still resident within the object store. Because the snapshot difference interface does not retrieve the snapshots from the object store, security is improved, resource and network consumption is reduced, there is less of an impact upon client I/O processing, and a catalog of the snapshots can be more efficiently built and recovered in the event of corruption.

20 Claims, 13 Drawing Sheets

Related U.S. Application Data

(60) Provisional application No. 63/338,066, filed on May 4, 2022.

(51) Int. Cl.
*G06F 11/1471* (2026.01)
*G06F 16/11* (2019.01)

(52) U.S. Cl.
CPC ............ *G06F 16/125* (2019.01); *G06F 16/11* (2019.01); *G06F 16/128* (2019.01); *G06F 2201/84* (2013.01)

(56) References Cited

U.S. PATENT DOCUMENTS

| | | | |
|---|---|---|---|
| 10,852,976 | B2 | 12/2020 | George et al. |
| 10,992,768 | B1 | 4/2021 | Bhatnagar et al. |
| 11,016,943 | B2 | 5/2021 | George et al. |
| 11,144,498 | B2 | 10/2021 | George et al. |
| 11,188,500 | B2 | 11/2021 | Kushwah et al. |
| 11,695,661 | B1 * | 7/2023 | Cherkas ................ H04L 43/028 709/223 |
| 12,061,525 | B2 | 8/2024 | George et al. |
| 12,259,791 | B2 | 3/2025 | George et al. |
| 2007/0124341 | A1 | 5/2007 | Lango et al. |
| 2014/0108351 | A1 | 4/2014 | Nallathambi et al. |
| 2019/0235971 | A1 | 8/2019 | Botelho et al. |
| 2020/0285611 | A1 | 9/2020 | George et al. |
| 2020/0285613 | A1 | 9/2020 | George et al. |
| 2020/0285614 | A1 | 9/2020 | George et al. |
| 2022/0342851 | A1 | 10/2022 | Singh et al. |
| 2023/0171195 | A1 | 6/2023 | Kalman et al. |
| 2023/0359529 | A1 | 11/2023 | George et al. |
| 2023/0359585 | A1 | 11/2023 | George et al. |

OTHER PUBLICATIONS

Non-Final Office Action mailed on Jun. 17, 2024 for U.S. Appl. No. 18/193,838, filed Mar. 31, 2023, 06 pages.
Notice of Allowance mailed on Apr. 11, 2024 for U.S. Appl. No. 18/193,825, filed Mar. 31, 2023, 08 pages.
Notice of Allowance mailed on Jul. 15, 2024 for U.S. Appl. No. 18/193,825, filed Mar. 31, 2023, 05 pages.
U.S. Appl. No. 18/193,825, filed Mar. 31, 2023, George et al.
U.S. Appl. No. 18/193,838, filed Mar. 31, 2023, George et al.
Notice of Allowance mailed on Dec. 18, 2024 for U.S. Appl. No. 18/193,838, filed Mar. 31, 2023, 07 pages.

* cited by examiner

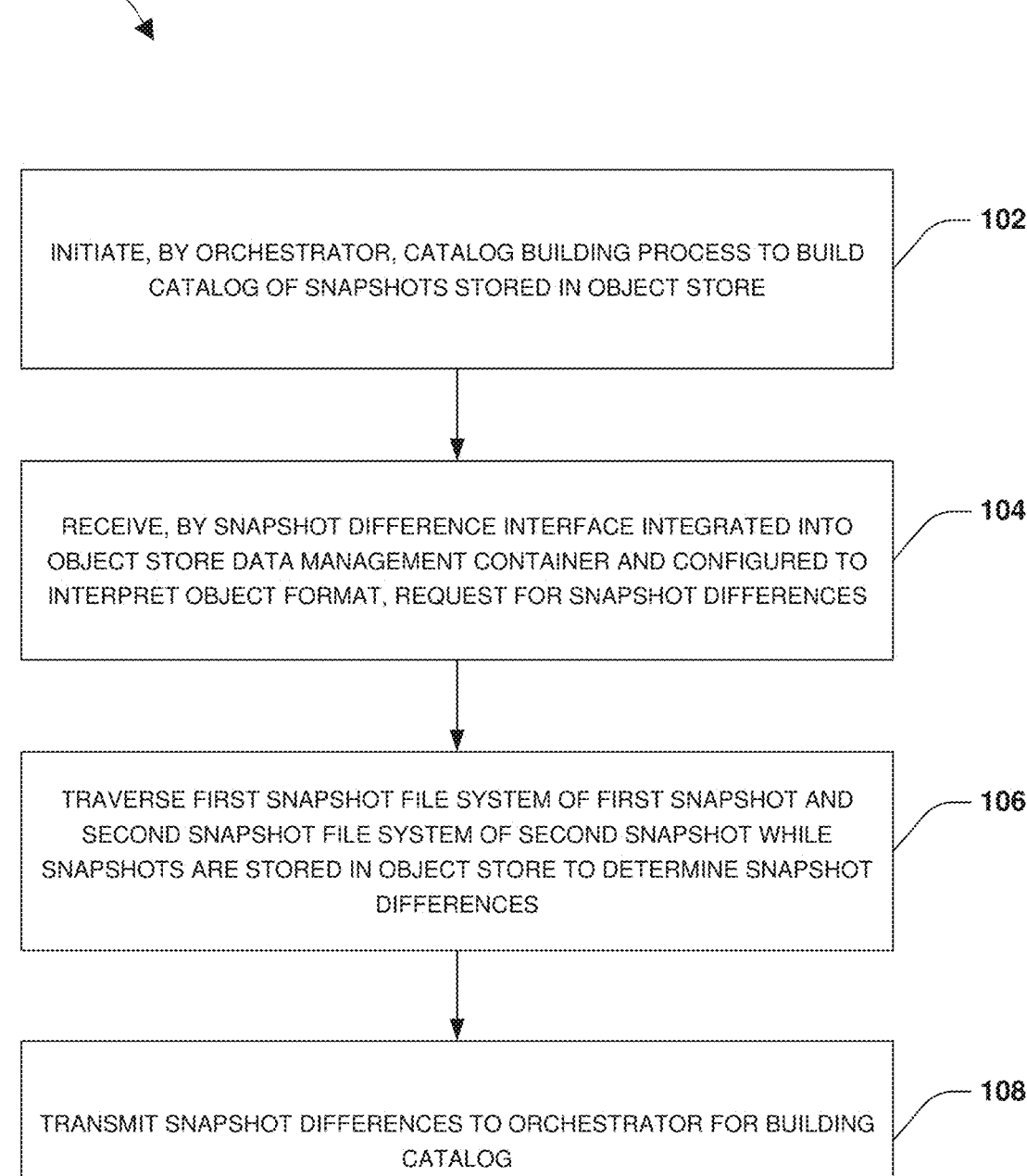

100

INITIATE, BY ORCHESTRATOR, CATALOG BUILDING PROCESS TO BUILD CATALOG OF SNAPSHOTS STORED IN OBJECT STORE — 102

RECEIVE, BY SNAPSHOT DIFFERENCE INTERFACE INTEGRATED INTO OBJECT STORE DATA MANAGEMENT CONTAINER AND CONFIGURED TO INTERPRET OBJECT FORMAT, REQUEST FOR SNAPSHOT DIFFERENCES — 104

TRAVERSE FIRST SNAPSHOT FILE SYSTEM OF FIRST SNAPSHOT AND SECOND SNAPSHOT FILE SYSTEM OF SECOND SNAPSHOT WHILE SNAPSHOTS ARE STORED IN OBJECT STORE TO DETERMINE SNAPSHOT DIFFERENCES — 106

TRANSMIT SNAPSHOT DIFFERENCES TO ORCHESTRATOR FOR BUILDING CATALOG — 108

Figure 3:
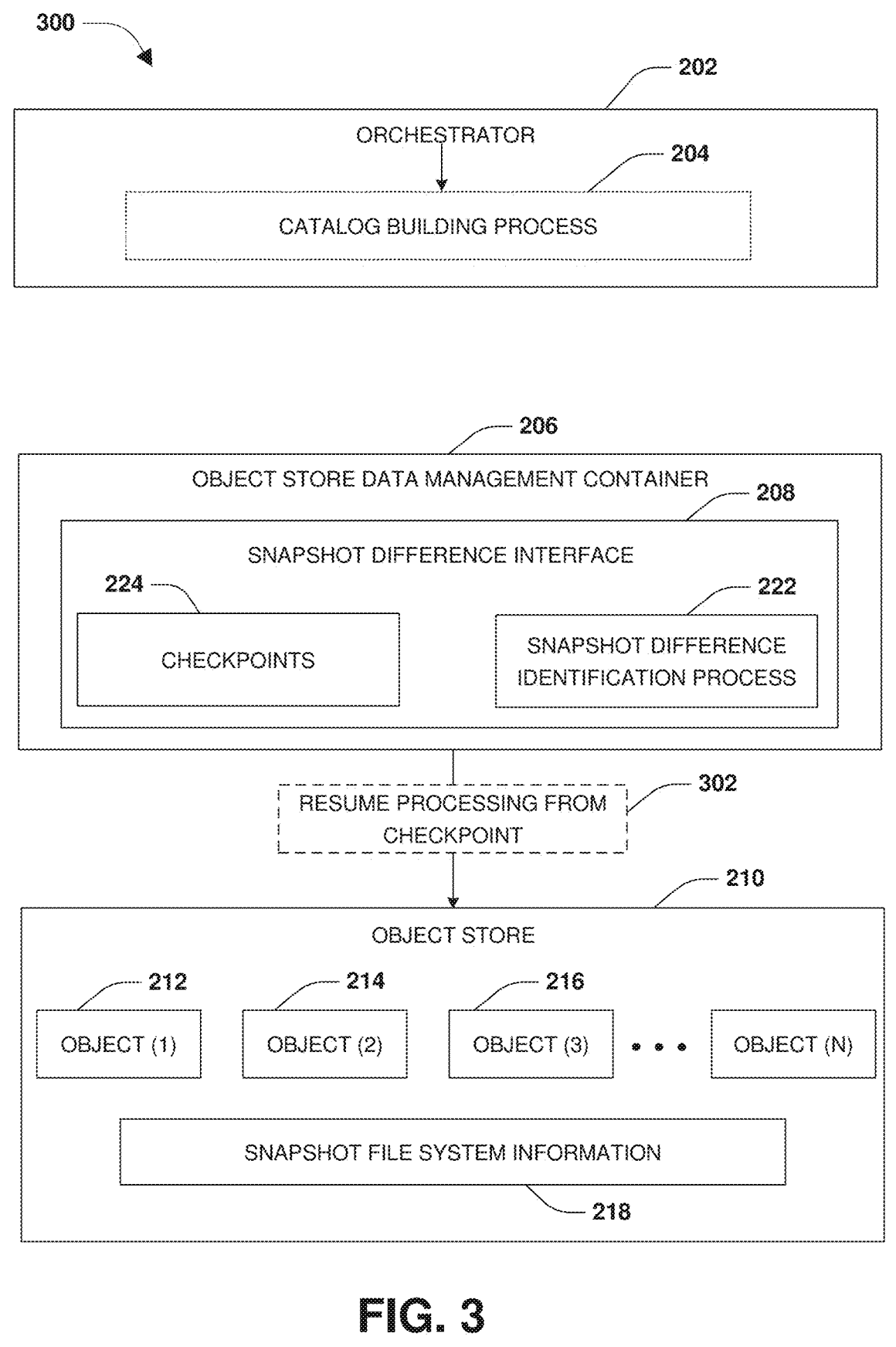

ORCHESTRATOR

204

CATALOG BUILDING PROCESS

206

OBJECT STORE DATA MANAGEMENT CONTAINER

208

SNAPSHOT DIFFERENCE INTERFACE

224

CHECKPOINTS

222

SNAPSHOT DIFFERENCE
IDENTIFICATION PROCESS

302

RESUME PROCESSING FROM
CHECKPOINT

210

OBJECT STORE

212

OBJECT (1)

214

OBJECT (2)

216

OBJECT (3)

• • •

OBJECT (N)

SNAPSHOT FILE SYSTEM INFORMATION

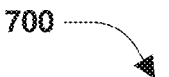

700

RECEIVE REQUEST TO IDENTIFY DIFFERENCES BETWEEN SET OF SNAPSHOTS 〜 702

DETERMINE NUMBER OF INSTANCES OF SNAPSHOT DIFFERENCE INTERFACE TO HOST 〜 704

HOST INSTANCES OF THE SNAPSHOT DIFFERENCE INTERFACE THROUGH SERVERLESS AND STATELESS CONTAINERS 〜 706

PROCESS, BY THE INSTANCES OF THE SNAPSHOT DIFFERENCE INTERFACE, PAIRS OF SNAPSHOTS OF THE SET OF SNAPSHOTS TO DETERMINE THE DIFFERENCE 〜 708

FIG. 7

OBJECT STORE DATA MANAGEMENT CONTAINER WITH INTEGRATED SNAPSHOT DIFFERENCE INTERFACE FOR CATALOGING SNAPSHOTS WHILE RESIDENT IN OBJECT STORE

RELATED APPLICATIONS

This application claims priority to and is continuation of U.S. Patent Application, titled "OBJECT STORE DATA MANAGEMENT CONTAINER WITH INTEGRATED SNAPSHOT DIFFERENCE INTERFACE FOR CATALOGING SNAPSHOTS WHILE RESIDENT IN OBJECT STORE", filed on Mar. 31, 2023 and accorded application Ser. No. 18/193,825, now U.S. Pat. No. 12,061,525, which claims priority to U.S. Provisional Patent Application, titled "OBJECT STORE DATA MANAGEMENT CONTAINER WITH INTEGRATED SNAPSHOT DIFFERENCE INTERFACE FOR CATALOGING SNAPSHOTS WHILE RESIDENT IN OBJECT STORE", filed on May 4, 2022 and accorded Application No.: 63/338,066, which is incorporated herein by reference.

BACKGROUND

A device such as a node may store data within a volume on behalf of a client. The volume may be stored within storage managed by the node, such as within on-prem storage. The node may implement storage management functions for the client. For example, the node may create backups of the volume by creating snapshots of the volume. A snapshot of the volume may capture a point-in-time representation of a state of the volume. The device may use the snapshot in order to restore the volume back to the state of the volume captured by the snapshot. Over time, a large number of snapshots may be created, which can consume a significant amount of storage. In order to more efficiently and cost effectively store these snapshots, the snapshots may be backed up to an object store that provides low cost and long term scalable storage compared to the storage managed by the node.

DESCRIPTION OF THE DRAWINGS

FIG. 1 is a flow chart illustrating an example method for implementing a snapshot difference interface in accordance with various embodiments of the present technology.

FIG. 3 is a block diagram illustrating an example system for implementing a snapshot difference interface in accordance with various embodiments of the present technology.

FIG. 7 is a flow chart illustrating an example method for implementing a snapshot difference interface in accordance with various embodiments of the present technology.

DETAILED DESCRIPTION

Figure 2:
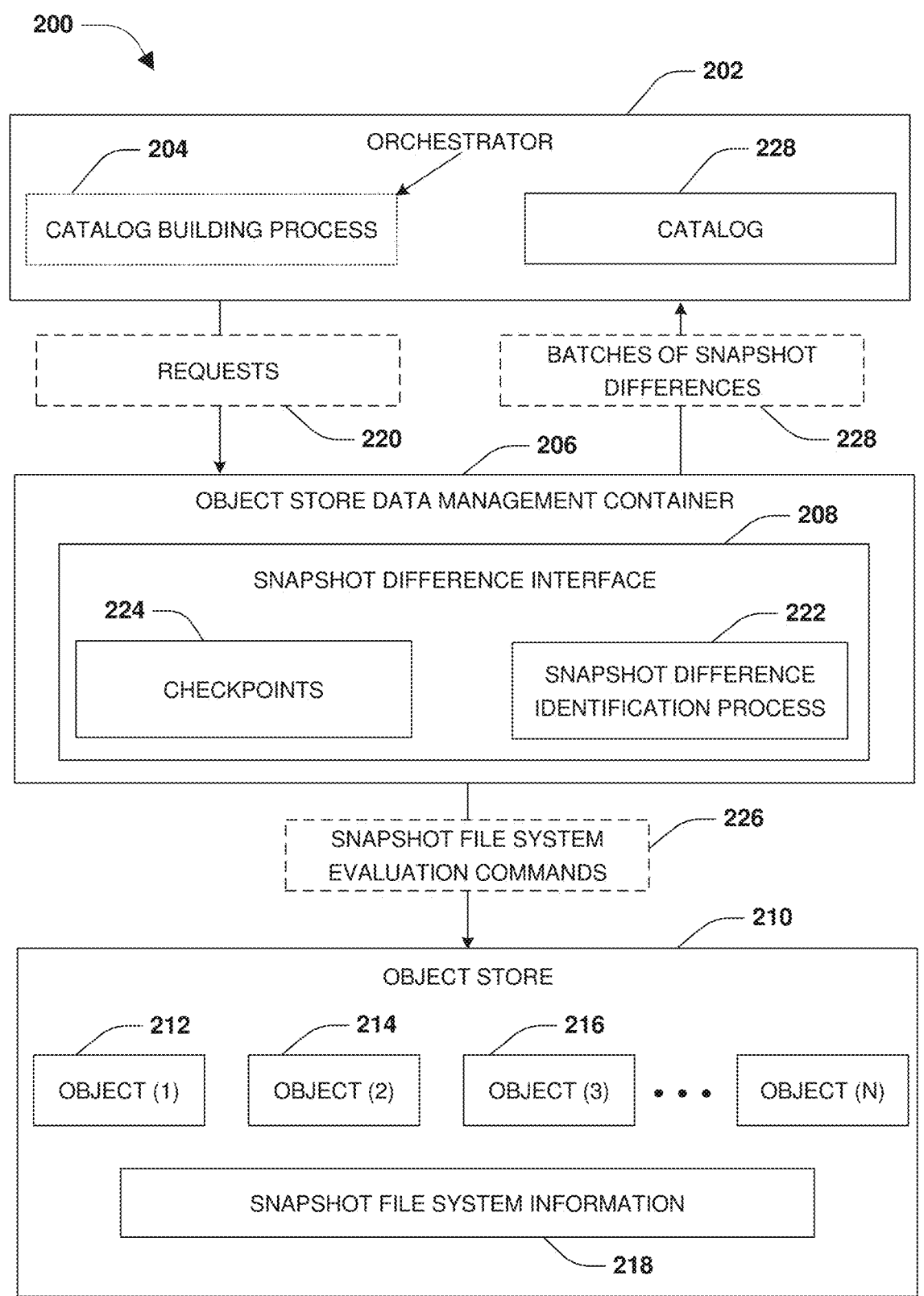
FIG. 2 is a block diagram illustrating an example system for implementing a snapshot difference interface in accordance with various embodiments of the present technology.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

A storage system may provide a client with storage functionality, such as the ability to store data within a volume that is stored on-premise or elsewhere. The storage system may provide backup functionality for the volume, such as the ability to create snapshots of the volume as point-in-time representations of the volume, which can be used to restore the volume to state captured by a snapshot. The storage system may be configured to store the snapshots into an object store, such as a cloud computing environment. For example, the storage system may store snapshot data of the snapshots into objects, and may store the objects into the object store at an endpoint such as a storage bucket. The objects may be formatted according to an object format that represents snapshots according to a snapshot file system, such as a tree structure used to locate snapshot data stored within the objects.

An object may comprise snapshot data of one or more snapshots, and snapshot data of a snapshot may be stored across multiple objects. This makes the performance of snapshot operations such as a catalog building operation non-trivial because snapshot data of a snapshot may be spread across multiple objects that may also comprise snapshot data of other snapshots. For example, an orchestrator may be configured to build a catalog of snapshots and versions of files captured within the snapshots so that a user can browse, access, and/or restore particular versions of files, directories, metadata, volumes, and/or snapshots. However, the orchestrator is unable to interpret the object format and snapshot file system of the snapshots, and thus cannot natively build the catalog without external functionality capable of interpreting the object format and snapshot file system of the snapshots. Additionally, the ability to catalog snapshots is difficult because there could be hundreds of thousands of snapshots for hundreds of volumes that could have millions of files. If a customer wants to restore a particular file from 6 months ago, the ability to actually find the snapshot capturing this version of the file is cumbersome and difficult (e.g., a 6 month old snapshot might not even capture the file or the version of the file).

With the aid of a storage operating system snapshot difference API, the orchestrator is configured to build a catalog describing changed files of snapshots so that a particular version of a file can be located and restored from backup data in the object store of a cloud computing environment. This catalog can be used to track snapshots and contents of the snapshots such as by identifying file changes that are captured by a particular snapshot. The orchestrator leverages the storage operating system snapshot difference API hosted at a primary datacenter (a local/ primary system) in order to build the catalog. The orchestrator makes calls to the storage operating system snapshot difference API in order to identify the difference between two snapshots, which can be used to build and populate the catalog.

There are many problems with the orchestrator utilizing the storage operating system snapshot difference API hosted at the primary system. First, the storage operating system snapshot difference API hosted at the primary system is the only way for the orchestration system to build the catalog. For each snapshot being processed, the snapshot must be logged at the primary system until the entire orchestration process of building the catalog is complete. There is no guarantee to the orchestration system for how long the primary system will retain the snapshot. If the orchestration process lags behind operations at the primary system (e.g., lags behind backups being performed for clients), then logged snapshots may be deleted by the primary system such as to free storage space, and thus the catalog for those snapshots would be lost.

Second, the orchestrator does not generally get direct access to a storage operating system due to security reasons. Many users impose restrictions upon transacting (e.g., the orchestrator transacting) with any file data or metadata with the storage operating system, as even a file name could be sensitive. Thus, the orchestrator is only allowed to create a relationship with the storage operating system and trigger an update such that only non-sensitive information is being transacted, which is very limiting. Also, security challenges arise when the orchestrator is separated from the snapshots by a strict firewall.

Third, because there can be hundreds of thousands of snapshots of thousands of volumes that each could have millions of files, there is a large burden placed on the storage operating system of the primary system by the orchestrator. The storage operating system snapshot difference API is not lightweight, and there can be a large amount of CPU resources consumed when identifying differences of data between snapshots for the orchestrator. This adversely affects clients that are accessing the storage operating system of the primary system, such as for accessing primary data managed and hosted by the storage operating system.

Fourth, when the storage operating system snapshot difference API at the primary system provides the difference information to the orchestrator and the orchestrator finishes populating the catalog (e.g., a database) for the snapshots, the snapshots are deleted from the primary system. If there is a corruption of the catalog and the cataloged information for the snapshots is lost, then there is no way to refresh this information from the primary system because the snapshots have been deleted, and the entire process may be restarted from scratch by again retrieving the snapshots from the object store to the primary system.

As provided herein, a snapshot difference interface is integrated into an object store data management container in order to solve the aforementioned problems of the orchestrator relying upon the storage operating system snapshot difference API hosted at the primary system. The object store data management container may be hosted in any type of computing environment, such as through a container of a container orchestration platform (Kubernetes), a serverless thread, a virtual machine, a server, a software module, a stateless container, a serverless and stateless container, etc. Instead of using the storage operating system snapshot difference API of the primary system to retrieve and log snapshots while the orchestrator is building the catalog, the orchestrator directly interfaces with the snapshot difference interface of the object store data management container that can operate on the snapshots while the snapshots remain in the object store. Thus, the snapshots are not being retrieved and logged at the primary system. Instead, the snapshot difference interface of the object store data management container is directly operating on the snapshots in the object store while the snapshots are still resident (stored within) in the object store. Any number of instances of the snapshot difference interface can be created and destroyed on-demand based upon a current workload and/or time allocated for identifying differences between snapshots. The more work to be performed (e.g., a large number of snapshots to compare) and/or the shorter the time allocated, the more instances of the snapshot difference interface are created on-demand for reducing the time to complete the task of identifying the differences amongst the snapshots. The instances of the snapshot difference interface can be destroyed on-demand to converse resource consumption.

The snapshot difference interface is capable of identifying file changes (data and metadata changes) amongst snapshots while the snapshots are resident in the object store so that the orchestrator can utilize this information to build the catalog without going through the primary system. This can be achieved because the snapshot difference interface is configured to interpret and traverse the object format and snapshot file system used to store snapshots in the object store. Because these snapshots are operated on while stored in the object store, the snapshot difference interface implements various new mechanisms to adjust for this fact, such as by performing checkpointing, providing information back to the orchestrator in batches, performing subsequent requests where a prior request left off, etc.

The snapshot difference interface of the object store data management container provides various improvements upon the prior storage operating system snapshot difference API hosted at the primary system. First, the orchestrator will no longer experience errors that would otherwise occur when the primary system would locally log snapshots that would deleted (e.g., such as to free storage space for processing client I/O) before completion of the orchestrator building the catalog. With this innovation, the snapshot difference interface can identify the difference between the snapshots while the snapshots still reside in the object store as opposed to being retrieved and logged at the primary system. This allows the orchestrator to build the catalog at its own pace without running into issues where the primary system deletes such snapshots before the orchestration process is complete.

Second, the snapshot difference interface solves security issues between the orchestrator and the primary system because the orchestrator is now interacting with the snapshot difference interface of the object store data management container that does not have cumbersome security issue when managing and accessing snapshots in the object store since the object store data management container already has access to this snapshot data (e.g., the object store data management container may be hosted through the object store as a serverless and/or stateless container). This solves security challenges such as where the orchestrator is hosted within a cloud computing environment and the storage operating system is hosted in a virtual private cloud (VPC) and are separated by a strict firewall.

Third, the snapshot difference interface of the object store data management container alleviates the resource burden otherwise placed on the primary system by the orchestrator calling the prior storage operating system snapshot difference API hosted at the primary system. The prior storage operating system snapshot difference API hosted at the primary system was not a lightweight mechanism and can starve resources that could otherwise be used by the primary system to process client I/O and storage management request. With the new snapshot difference interface of the object store data management container, the object store data management container can be dynamically created as a container to host the snapshot difference interface separate from the primary system. If a current snapshot difference workload increases, then any number of parallel processes/ containers can be spun up to perform the snapshot difference work (e.g., to populate the catalog (database)) faster since compute and storage are disassociated (e.g., within a Kubernetes environment), thus allowing orchestration to scale up or down as needed.

Fourth, because the snapshot difference interface operates on snapshots while the snapshots are stored in the object store (instead of the prior storage operating system snapshot difference API hosted at the primary system retrieving and logging snapshots at the primary system during population of the catalog), the snapshots are always available at the object store for regenerating the catalog in the event of a corruption. This also provides the ability to maintain merely a single copy of the catalog because it may be easy to regenerate the catalog directly from the snapshots in the object store. This alleviates issues where the primary system would delete the locally logged snapshots after the catalog is populated, and thus the snapshots are not subsequently available for regenerating the catalog. In some embodiments, the catalog may be created at a first point in time. In response to detecting an issue with the catalog (e.g., a loss of data, data corruption, a loss of the entire catalog, etc.), the catalog can be efficiently regenerated to repair or replace the catalog using the snapshots still available within the object store since the catalog can be generated and regenerated by processing the snapshots while the snapshots are stored within the object store.

Some embodiments of the snapshot difference interface performing a difference operation (diffing) to identify file changes between two snapshots residing in the object store is as follows: the snapshot difference interface diffs (e.g., performs a difference operation between) an inofile root to get changed file block numbers (fbns) between two snapshots. The changed fbns represent blocks with changed inodes. The snapshot difference interface reads a changed fbn block and diffs the inodes of the changed fbn block (e.g., each changed fbn may have maximum of 14 inodes or any other number of inodes). In particular, the snapshot difference interface read all the inodes (e.g., 14 inodes) from the changed fbn block (as a diff block) from both of the snapshots. The snapshot difference interface diffs each inode block to get inodes that are different. For each inode with links (e.g., hard links to external inodes), an inode to path structure is traversed to obtain the changed link inodes. The snapshot difference interface fills attributes (e.g., within snapshot difference information) from the changed inodes in order to respond back to the orchestrator with the snapshot difference information. For example, the snapshot difference interface constructs a file name by performing the following: for each inode that is different, a reverse lookup is performed. A parent inode and entry offset within the parent inode is obtained and used to traverse up a snapshot file system to reach a root inode of the file to determine the file name.

In some embodiments of the snapshot difference interface identifying changed blocks, modification of a block (a data block) of a file will result in replacing the block instead of overwriting the original block. A buftree of the file is remapped to point to the new block by replacing indirect blocks at every level until reaching a root of the buftree. A difference operation of the snapshot difference interface takes advantage of this mechanism to identify the changes between the copies of the file in two snapshots. The difference operation compares the buftrees of the file in two snapshots (e.g., buftrees within snapshot file systems) and will traverse down a particular sub-tree only if a root of the sub-tree has changed, which will happen only if at least one of the blocks (file blocks) underneath the sub-tree has changed. Therefore, with this mechanism, the difference operation will efficiently walk the buftrees to identify changes in only those paths where data has changed. If there are no changes under a subtree, the difference operation will hop over by the stride of the subtree within the buftrees.

The object store data management container reports the changed files in two snapshots. To achieve this, the snapshot difference interface performs a difference operation for an inofile root (e.g., a file containing inodes of all files captured by a snapshot). Changed fbns of these files gives the changed inodes in the snapshot. In some embodiments, the snapshot difference interface performs an inofile root difference operation to obtain changed fbns of a particular file. In some embodiments, the snapshot difference interface identifies inodes from changed fbns. Each user block (e.g., an L0 block) of an inofile root has 14 inodes or some other number of inodes. The snapshot difference interface compares individual inodes within changed fbns to get changed inodes. The snapshot difference interface reads the changed fbn blocks of a base snapshot and an incremental snapshot (a pair of snapshots being diffed). For each block after denormalization, a comparison is performed for each inode contents. In some embodiments, the snapshot difference interface constructs file names from inodes. Using the diff inode (a changed inode), the snapshot difference interface constructs file paths by performing a reverse lookup using the following: Get primary_t structure from inode: typedefstructs2c_primary_name_s {uint32_tspn_parent_dir_inode; uint32_tspn_cookie;} s2c_primary_name_t. A spn_cookie points to an fbn and a slot (e.g., a slot within an object) where the name of the file exists. The higher 20 bits (or some other number of bits) is the fbn of a directory inode, and lower 12 bits (or some other number of bits) is an entry number within that particular fbn. This is repeated until the snapshot difference interface reaches the root inode (e.g., root inode 64). For hard links, an inode to path metafile is queried to obtain another path for the same inode.

One embodiment of implementing a snapshot difference interface integrated into an object store data management container is illustrated by an exemplary method 100 of FIG. 1, which is further described in conjunction with the systems of FIGS. 2-6B. A storage system hosts a volume within which data may be stored on behalf of a client. The storage system generates snapshots of the volume. Snapshot data of the snapshots are stored into objects and the snapshots are represented by snapshot file systems. The objects, such as a first object 212, a second object 214, and a third object 216, are stored within an object store 210 such as an object store of a remote cloud computing environment. The objects may be formatted according to an object format. The snapshot file systems are stored as snapshot file system information 218 (metadata) that are stored as objects within the object store 210. It may be appreciated that an example of the object format is illustrated by FIG. 9C and that an example of a snapshot file system (a tree structure stored within snapshot file system information 218) is illustrated by FIG. 9B.

An object store data management container 206 has access to the object store 210. The object store data management container 206 is hosted within the remote cloud computing environment hosting the object store 210, on-premise remote to the object store 210, or within any other computing environment. The object store data management container 206 is hosted as a container within a container orchestration environment (Kubernetes), a serverless thread, a virtual machine, a server, a software module, a serverless and/or stateless container, etc. The object store data management container 206 hosts a snapshot difference interface 208.

The snapshot difference interface 208 is natively capable of interpreting the object format and snapshot file system (snapshot file system information 218). For example, the snapshot difference interface 208 can traverse and process the snapshot file system information 218 (e.g., traverse and read a base root object, snapinfo objects, inofiles, etc.) in order to identify files, inodes, directories, metadata, and/or other data of multiple snapshots in order to identify changed files, inodes, directories, metadata, and/or other data between the snapshots, along with identifying which objects (slots within objects) comprise snapshot data of the snapshots. The snapshot difference interface 208 is capable of directly interfacing with the snapshots stored within the object store 210 while the snapshots are actually stored within the object store 210 (stored within the objects) and without having to retrieve the snapshots from the object store 210. The snapshot difference interface 208 is accessible to an application (e.g., an orchestrator 202) such that the snapshot difference interface 208 can process requests 220 from the application for identifying snapshot differences (changed files) between two snapshots.

The orchestrator 202 is configured to implement a catalog building process 204 to build a catalog 228 of snapshots stored within the object store 210, during operation 102 of method 100. The catalog 228 is built by the orchestrator 202 to list and/or describe each snapshot and differences between snapshots, such as to provide a list of different versions of a file captured by one or more snapshots over time. In order to build the catalog 228, the catalog building process 204 interacts with the object store data management container 206 in order to transmit requests for snapshot differences between snapshots. Accordingly, during operation 104 of method 100, the snapshot difference interface 208 of the object store data management container 206 receives a request from the orchestrator 202 for snapshot differences amongst a first snapshot and a second snapshot. The snapshot difference interface 208 is configured to identify the snapshot differences while the first snapshot and the second snapshot are retained within the object store 210 and without retrieving the first snapshot and second snapshot from the object store 210. The snapshot difference interface 208 implements a snapshot difference identification process 222 to identify the snapshot differences.

The snapshot difference identification process 222 performs snapshot file system evaluation commands 226 that are implemented through the object store 210 to evaluate the first snapshot and the second snapshot for identifying the snapshot differences without retrieving the first snapshot and the second snapshot from the object store 210. The snapshot file system evaluation commands 226 are performed by the snapshot difference interface 208 to evaluate a first snapshot file system of the first snapshot and a second snapshot file system of the second snapshot to determine the snapshot differences between the first snapshot and the second snapshot, during operation 106 of method 100. The first snapshot file system and the second snapshot file system are stored as metadata within the snapshot file system information 218. During performance of the snapshot file system evaluation commands 226 by the snapshot difference identification process 222 executed by the snapshot difference interface 208, the snapshot difference interface 208 generates checkpoints 224 that can be used to resume 302 the snapshot difference identification process 222 from a progress point captured by a checkpoint, as illustrated by FIG. 3. This allows the snapshot difference identification process 222 to be paused, resumed, transitioned from one instance of the snapshot difference interface 208 hosted by an instance of the object store data management container 206 to a different instance of the snapshot difference interface 208 hosted by a different instance of the object store data management container 206 such as for load and/or performance balancing.

In some embodiments of evaluating the first snapshot file system of the first snapshot and the second snapshot file system of the second snapshot, the snapshot difference interface 208 executes the snapshot difference identification process 222 to perform a difference operation as part of the snapshot file system evaluation commands 226. The difference operation is performed upon an inofile root (e.g., a root of inofile 918 of FIG. 9B) to obtain file block numbers representing blocks of changed inodes (a change inode corresponding to a changed file) between the first snapshot and the second snapshot. The snapshot difference identification process 222 reads the blocks represented by the file block numbers and performs difference operations (as the snapshot file system evaluation commands 226) on the blocks to identify inodes that are different between the first snapshot and the second snapshot (inodes of changed files that are different between the first snapshot and the second snapshot).

In some embodiments, the snapshot difference identification process 222 reads a set of inodes from the first snapshot and the second snapshot to identify inodes that are different. These inodes correspond to different versions of a file between the first snapshot and the second snapshot (e.g., the file may be modified from when the first snapshot was created to when the second snapshot was created). For an inode with a link (a hard link), an inode to path (I2P) metafile is traversed to identify and obtain changed link inodes (link inodes that are linked to by hard links where the link inodes are different between the first snapshot and the second snapshot). The changed inodes (inodes that are different) and the changed link inodes correspond to the snapshot differences (e.g., an inode of the first snapshot that is different than the inode of the second snapshot, which may correspond to different versions of a file within the first snapshot and the second snapshot).

As part of identifying the snapshot differences, file names (file paths) are reconstructed for the files that are different between the first snapshot and the second snapshot (files corresponding to the changed/different inodes). For an inode identified as being different between the first snapshot and the second snapshot, a reverse lookup is performed to obtain a parent inode and an entry offset within the parent inode of the inode. This information is used to traverse up a snapshot file system (tree structure such as a buftree of a file represented by the inode) to a root inode specifying the file name. In this way, file names (file paths) may be identified as the snapshot differences. As subsequent requests for snapshot differences between other snapshots are received from the orchestrator 202, the snapshot difference interface 208 continues to process the requests, which may pick up from where the last snapshot difference for a pair of snapshots left off.

During operation 108 of method 100, the snapshot differences are provided by the snapshot difference interface 208 back to the catalog building process 204 for building the catalog 228. In some embodiments, the snapshot differences are provided to the catalog building process 204 in batches from the snapshot difference interface 208. The catalog building process 204 uses the snapshot differences to build the catalog 228 that identifies each of the snapshots whose snapshot data is stored within the object store 210, along with other information of files, directories, metadata, and/or other data captured by each snapshot. The catalog 228 also identifies different versions of the files, directories, metadata, and/or other information captured by the snapshots.

Figure 4:
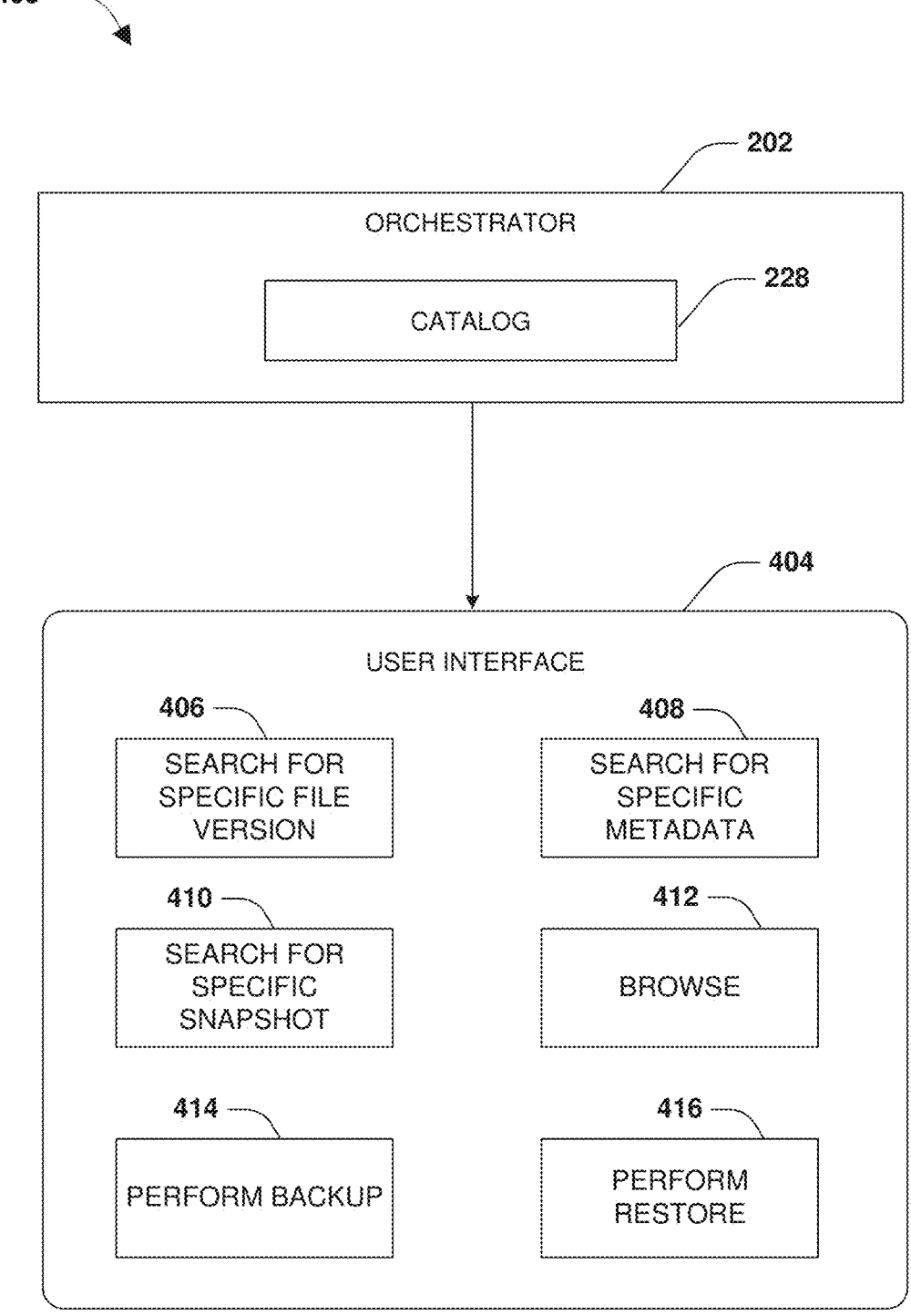
FIG. 4 is a block diagram illustrating an example system for providing a user interface associated with a catalog of snapshots in accordance with various embodiments of the present technology.

The orchestrator 202 utilizes the catalog 228 to construct and populate a user interface 404 that may be displayed to a user, as illustrated by FIG. 4. The user interface 404 is populated with various functionality that the user can invoke. For example, the user may utilize search functionality 406 to search for a specific file version of a file, which may be identified by the catalog 402 as being stored within a particular snapshot backed up to the object store 210. The user may utilize search functionality 408 to search, through the catalog 402, for specific metadata, which may be identified within a particular snapshot backed up to the object store 210. The user may utilize search functionality 410 to search, through the catalog 402, for a specific snapshot backed up to the object store 210. The user may utilize browse functionality 412 to visually navigate and browse, through the catalog 402, amongst snapshots and content captured by the snapshots (e.g., browse particular versions of files, directories, and metadata).

Figure 5:
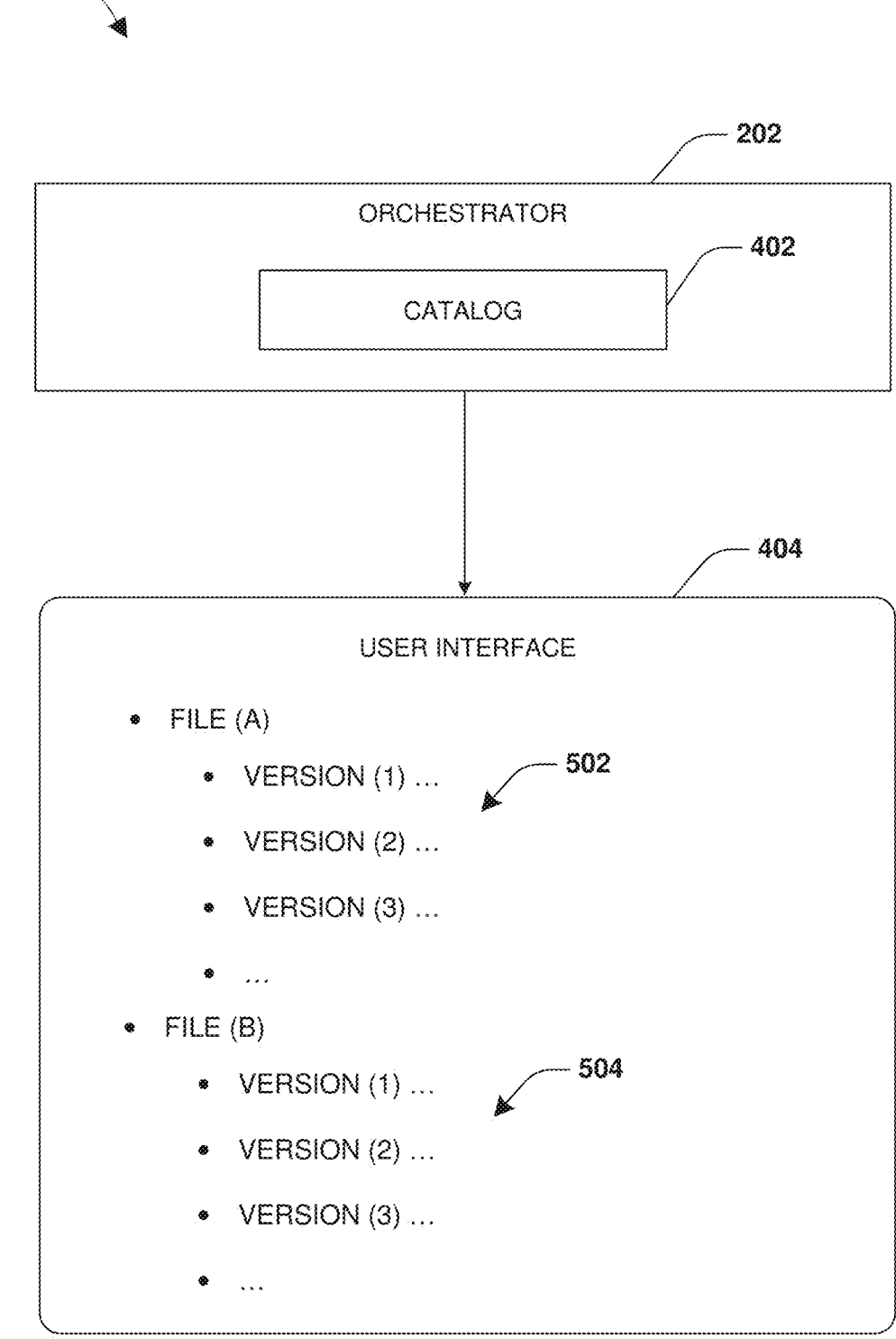
FIG. 5 is a block diagram illustrating an example system for providing a user interface associated with a catalog of snapshots in accordance with various embodiments of the present technology.

An embodiment of visually navigating and browsing versions of files, such as versions of a file (A) 502, versions of a file (B) 504, and/or versions of other files, is illustrated by FIG. 5. As user input, navigating amongst content of the snapshots, is received, the user interface 404 is visually modified to display corresponding content.

Figure 6A:
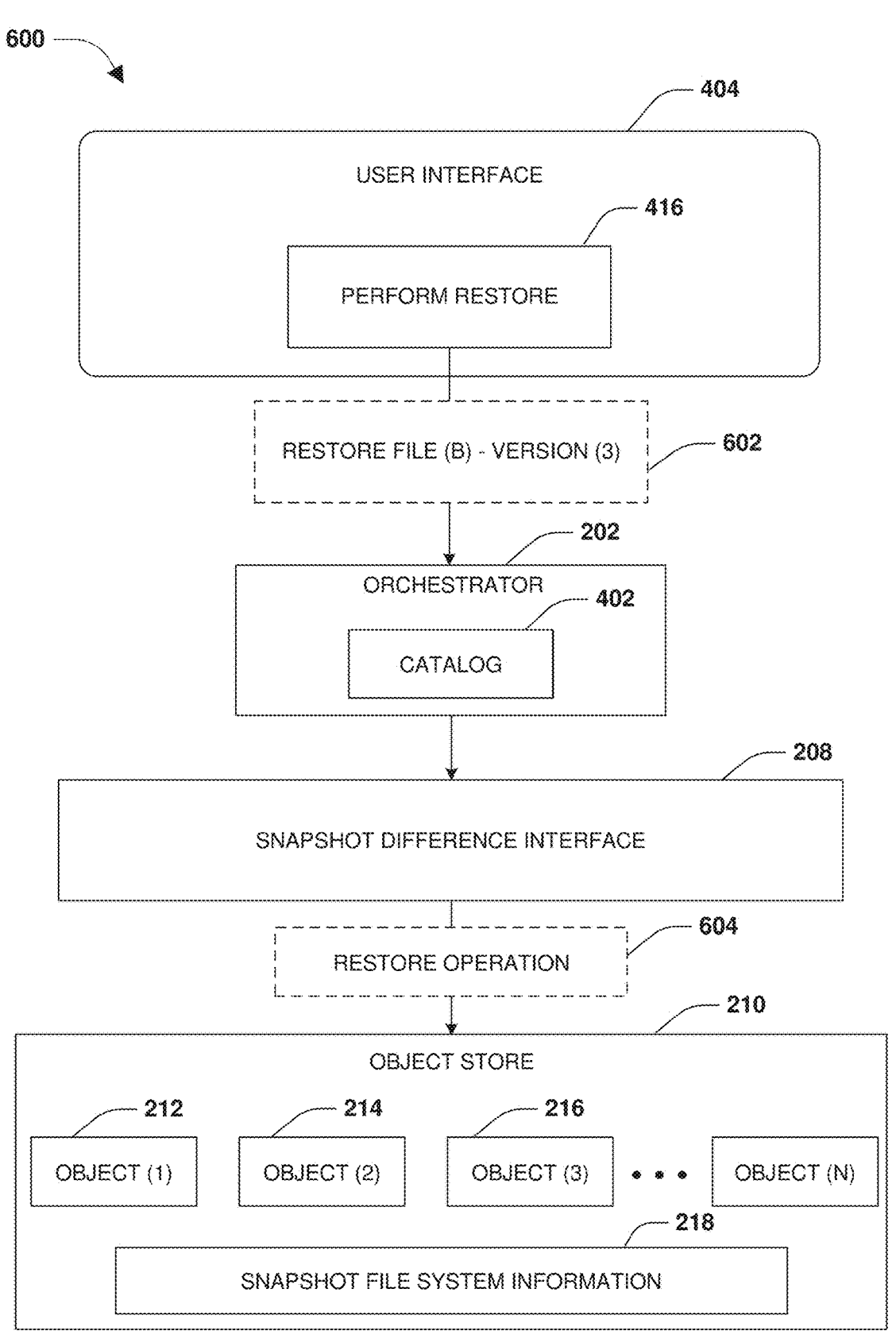
FIG. 6A is a block diagram illustrating an example system for performing a restore operation in accordance with various embodiments of the present technology.

Returning to FIG. 4, the user may utilize backup functionality 414 to initiate a backup of a volume for creating a snapshot of the volume and backing the snapshot up to the object store 210. The user may utilize restore functionality 416 to select a particular version of a directory, a file, a volume, a qtree, or other granularity of content to restore from the backed up snapshots in the object store 210 to a restore target. FIG. 6A illustrates an embodiment of the restore functionality 416 being invoked to restore 602 a version (3) of the file (B) by performing a restore operation 604 using a particular snapshot backed up to the object store 210 to restore the version (3) of the file (B) from the snapshot to a restore target (e.g., a target computing device or computing environment to reconstruct the version (3) of the file (B)).

Figure 6B:
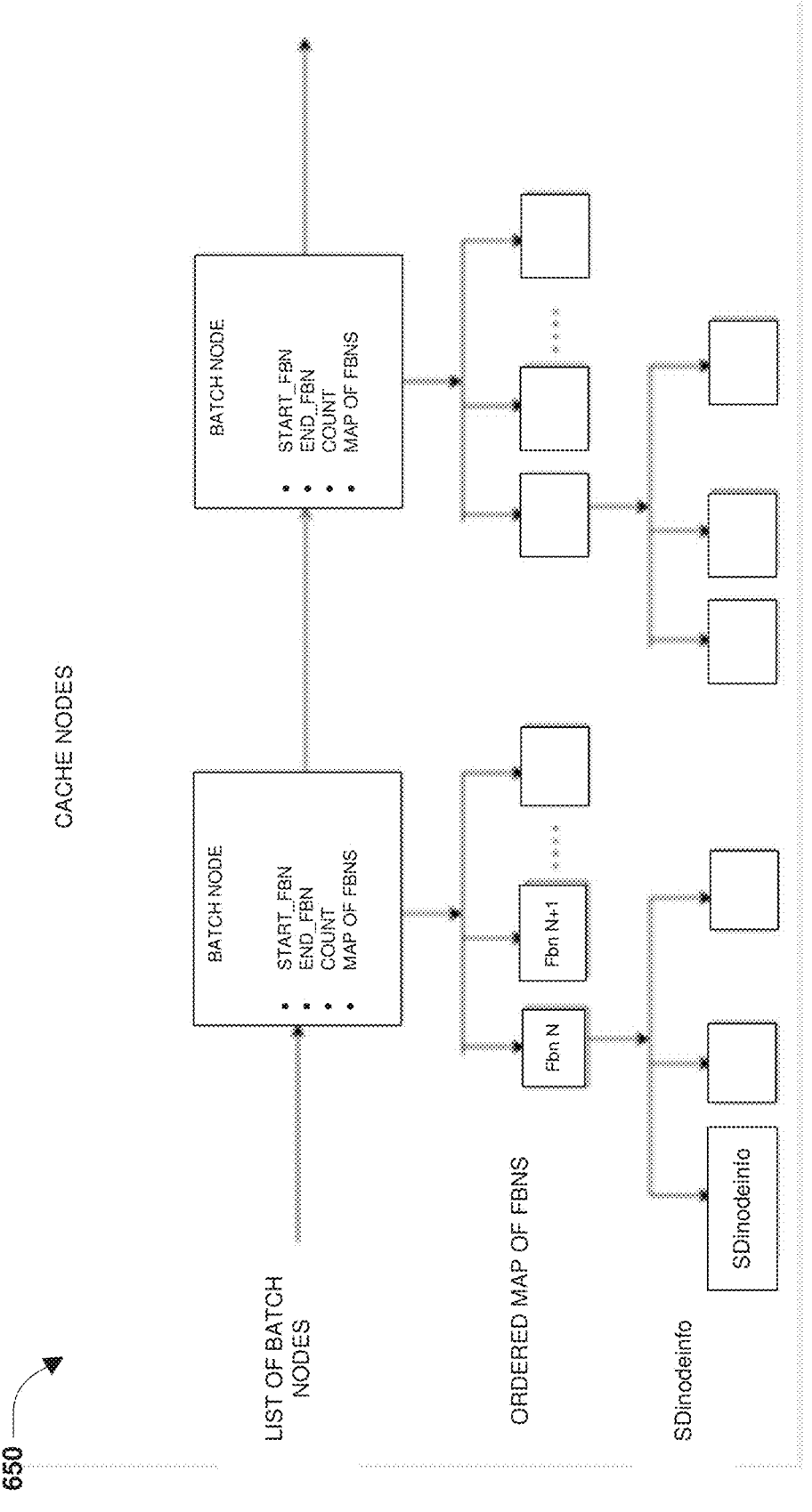
FIG. 6B is a block diagram illustrating an example system for caching nodes in accordance with various embodiments of the present technology.

FIG. 6B illustrates caching. A difference operation is performed on a batch of file block numbers (fbns) for each request (e.g., a request for a difference between two snapshots that include the fbns). The batches are stored as cache nodes 650 within memory. The cache nodes 650 include a list of batch nodes. A batch node includes a start fbn of the batch, an end fbn of the batch, a count of fbns of the batch, and a map of fbns (e.g., an ordered map of fbns) of the batch. The fbns in the map of fbns point to SDinodeinfos. A batch stores all changed records between a start fbn and an end fbn (e.g., a batch of fbns being processed/diffed by the difference operation for identifying any fbns that are different between a pair of snapshots). A whole batch is added or deleted together from the range of the start fbn to the end fbn. There are no duplicate batches maintained within the cache nodes 650 in the memory. Results are fetched/stored within the cache nodes 650 in the memory. That is, differences between snapshots are cached within the cache nodes 650 so that the cached differences are retrieved from the cache nodes 650 when a request for the differences is received, as opposed to having to recalculate that differences. In some embodiments, the memory has at most two nodes (batches) at any given point in time. In addition to using the cache nodes 650, a difference operation can make use of a least recently used (LRU) cache of an object store data management container to store blocks based on block types. There is also an inode to name cache, used as a reverse lookup to avoid walking a parent tree for known names of files identified as different between a pair of snapshots. The difference operation use the object store data management container to perform a prefetch for slots while reading objects in the object store, which is used to prefetch additional continuous slots beyond a particular requested slot.

In some embodiments, the object store data management container 206 is a container that supports REST API requests (e.g., GET request) that may target the snapshot difference interface 208. An endpoint is a snapshot (a cloud backup) of a volume, which has a unique UUID (e.g., 8bc58108-081e-4a43-b919-a376c225bf53). So, the snapshot difference interface 208 may perform a difference operation (e.g., a diff operation such as a snapdiff operation) on the endpoint, and specifies the UUIDs of the 2 snapshots upon which the difference operation is to be performed (e.g., snapdiffs?base_snapshot=2fd61216-f909-4461-9b50-2be815da1f1a&diff_snapshot=83f447fc-c130-4dbf-828a-c176d725a170). Thus, this is used as a query. In some embodiments, there may be a maximum limit of the number of difference operations that may be performed at a given point of time (e.g., 8, 256, or any other number). If there are more difference operation results than the maximum limit, then the object store data management container 206 will return a 307 Response with a temporary redirect location that has a cookie that the object store data management container 206 can use to do the next set of difference operations and write the difference operation results once the object store data management container 206 is ready. In some embodiments, an example difference operation result (a snapshot difference) may be: Record Example "records": [{"atime": 1636503098, "change-type": "inode_modification", "crtime": 1636487623, "ctime": 1636503063, "dosbits": 0, "fattr": 511, "filename": "/", "ftype": 2, "group": 0, "inode": 64, "is-file-fenced": 0, "links": 3, "mtime": 1636503063, "owner": 0, "size": 4096}. The "filename": "/" is the root directory. The example difference operation result (a snapshot difference) may specify changes such as access time (atime), change time (ctime), or change type "inode modification." The object store data management container 206 may also return whether it is the "end-of-diff" and done, and may also return "num changes" between the two snapshots. The example difference operation result (a snapshot difference) may correspond to various change types, such as inode modification, file created, file deleted, etc. This information may be provided to the orchestrator 202 as the snapshot differences, which may identify changed files between the two snapshots. Other fields such as a progress field, flags, response time for API to write results, and/or other fields may be used.

Figure 8:
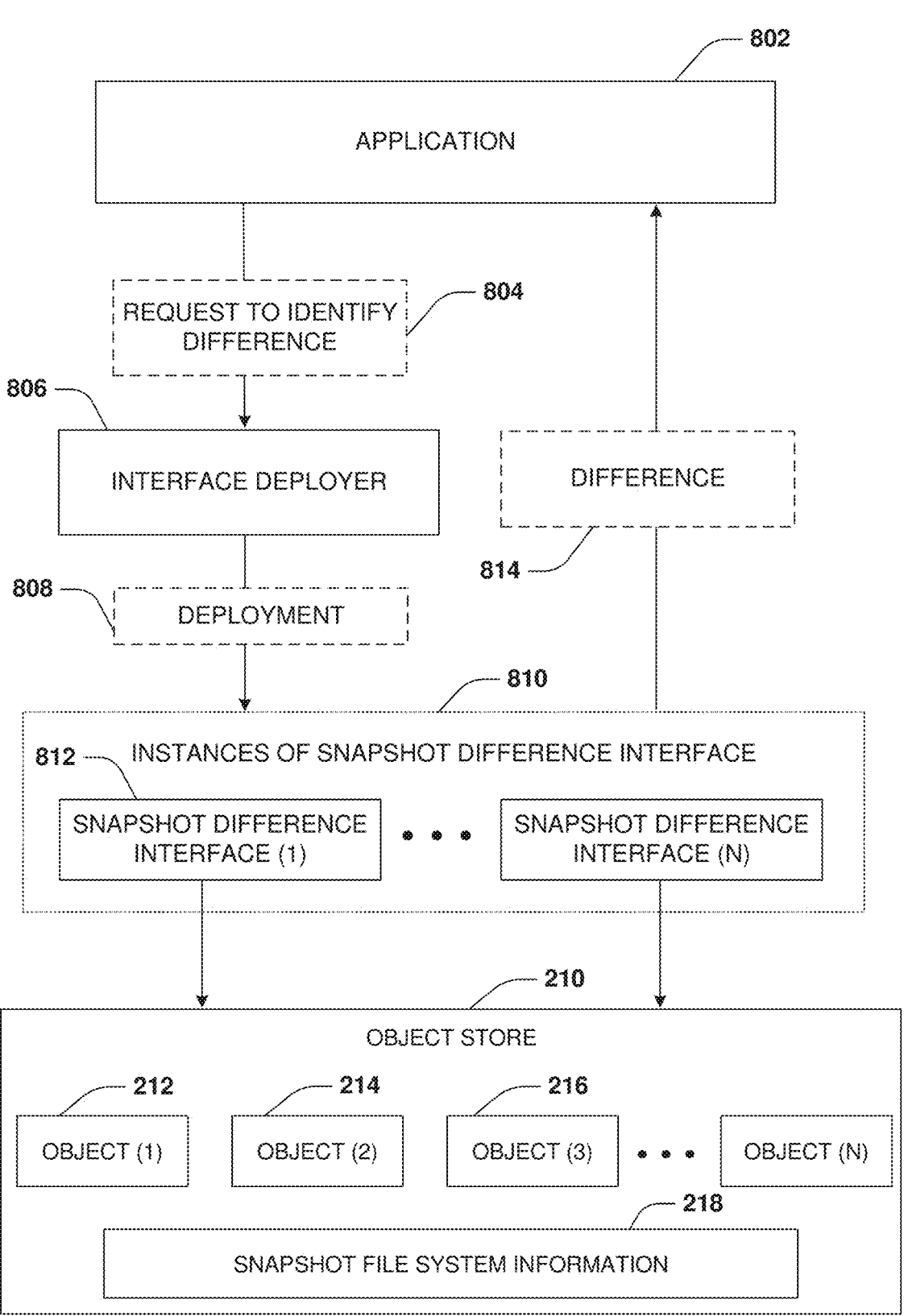
FIG. 8 is a block diagram illustrating an example system for implementing a snapshot difference interface in accordance with various embodiments of the present technology.

FIG. 7 is a flow chart illustrating an example method 700 for implementing a snapshot difference interface, which is described in conjunction with FIG. 8. Snapshot data of snapshots are stored within objects of the object store 210, such as within the first object 212, the second object 214, the third object 216, and/or other objects. The snapshots are represented by snapshot file system information 218. An interface deployer 806 may be configured to create, on-demand, instances of a snapshot difference interface 810 for identifying differences between the snapshots whose snapshot data is stored within the objects of the object store 210. The interface deployer 806 receives a request 804 from an application 802 to identify differences between a set of snapshots, during operation 702 of method 700. In some embodiments, the request 804 may indicate that a difference between a first snapshot and a second snapshot is being requested. In some embodiments, the request 804 may indicate that a difference amongst any number of snapshots is being requested. In some embodiments, the request 804 may indicate that differences amongst snapshots of a volume is being requested. In some embodiments, the request 804 may indicate that differences amongst snapshots of a plurality of volumes is being requested.

During operation 704 of method 700, the interface deployer 806 determines/calculates a number of instances of the snapshot difference interface 810 to host. In some embodiments, the interface deployer 806 determines the number of instances of the snapshot difference interface 810 to host based upon properties of the request 804 and/or of the set of snapshots to process, such as a number of pairs of snapshots to process, an amount of data consumed by the set of snapshots, and/or a number of files, directories, and metadata captured by the set of snapshots. The number of instances of the snapshot difference interface 810 to host are determined based upon the number of volumes captured by the set of snapshots, such as where each instance of the snapshot difference interface 810 will process snapshots of a particular volume.

In some embodiments, a determination is made that the snapshot difference interface is to process a data set. The dataset is divided into a plurality of portions at a granularity corresponding to at least one of backups, volumes, snapshots, or snapshot ranges. The instances of the snapshot difference interface are hosted as serverless instances through a storage layer hosting the dataset. The serverless instances of the snapshot difference interface process the plurality of portions of the dataset in parallel.

The number of instances of the snapshot difference interface 810 to host are determined based upon a number of block ranges of storage used to store snapshot data of the set of snapshots (e.g., storage used to store a 1 TB snapshot may be divided/parsed into a particular number of block ranges such as 200, 500, 20,000, or some other number of block ranges that may be dynamically selected by the interface deployer 806). For example, the interface deployer 806 identifies an amount of available resources for hosting the instances of the snapshot difference interface 810, which corresponds to a total number of instances of the snapshot difference interface 810 that can be hosted to process the request 804 and/or other requests. The interface deployer 806 may determine an amount of time to allocate to completing the request 804. The more instances of the snapshot difference interface 810 that are used, the shorter the amount of time to complete the request 804. Accordingly, the amount of time to allocate to complete the request 804, the amount of available resources, and/or the total number of instances of the snapshot difference interface 810 that can be hosted may be used to determine a number of instances of the snapshot difference interface 810 to host. Each of the instances of the snapshot difference interface 810 may be assigned to process different block ranges storing snapshot data of the set of snapshots (e.g., an even distribution or an uneven distribution of block ranges may be assigned to the instance the snapshot difference interfaces 810). In this way, the more volumes, block ranges, data, files, directories, and/or pairs of snapshots to process and the shorter the amount of time allocated to process the request 804, the more instances of the snapshot difference interface 810 are deployed 808.

During operation 706 of method 700, the interface deployer 806 deploys 808 the number of the instances of the snapshot difference interface 810 for processing the request 804. The instances of the snapshot difference interface 810 for processing the request 804 are deployed in parallel where each instance of the snapshot difference interface 810 processes one or more pairs of snapshots for identifying differences between the pairs of snapshots in parallel. It may be appreciated that any number of instances of the snapshot difference interface 810 may be deployed and hosted, such as a first instance of the snapshot difference interface 812. In some embodiments, the first instance of the snapshot difference interface 812 are hosted within a container (e.g., a Kubernetes container or any other container). In some embodiments, the first instance of the snapshot difference interface 812 are hosted through a serverless thread. In some embodiments, the first instance of the snapshot difference interface 812 are hosted within a serverless container. In some embodiments, the first instance of the snapshot difference interface 812 may be hosted as a stateless container. In some embodiments, the first instance of the snapshot difference interface 812 are hosted as a serverless and stateless container. In some embodiments, the first instance of the snapshot difference interface 812 may be hosted within a virtual machine.

The interface deployer 806 assigns pairs of snapshots, snapshots of a particular volume, and/or block ranges used to store snapshot data of snapshots to the each of the instances of the snapshot difference interface 810. During operation 708 of method 700, the instances of the snapshot difference interface 810 process the pairs of snapshots (or block ranges) to identify differences between the pairs of snapshots. The pairs of snapshots may be processed in parallel by the instances of the snapshot difference interface 810. As part of the first instance of the snapshot difference interface 812 processing a pair of snapshots that includes a first snapshot and a second snapshot, the first instance of the snapshot difference interface 812 evaluates the snapshot file system information 218 to access a first snapshot file system of a first snapshot and a second snapshot file system of the second snapshot. The first instance of the snapshot difference interface 812 traverses the first snapshot file system and the second snapshot file system to identify differences between the first snapshot and the second snapshot for inclusion within the difference 814 between the set of snapshots requested by the application 802 through the request 804. If multiple instances of the snapshot difference interface are processing different block ranges of the snapshots, then the differences of the different block ranges, as determined by the multiple instance of the snapshot difference interface, are combined as the difference 814.

In some embodiments of the first instance of the snapshot difference interface 812 determining the difference between the pair of snapshots, the first instance of the snapshot difference interface 812 performs a difference operation upon an inofile root (e.g., a root of inofile 918 of FIG. 9B) to obtain file block numbers representing blocks of changed inodes between the first snapshot and the second snapshot. Blocks represented by the file block numbers are read by the first instance of the snapshot difference interface 812, which performs difference operations on the blocks to identify inodes that are different as part of the difference between the pair of snapshots. If an inode has a link, then an inode to path is traversed to obtain changed link inodes as part of the difference between the pair of snapshots. The first instance of the snapshot difference interface 812 may construct a file name of a file that is different between the pair of snapshots by performing a reverse lookup for an inode identified as different between the pair of snapshots in order to obtain a parent inode and entry offset within the parent inode for the inode of the file. A traversal of parent inodes (traversal up through a snapshot file system) to reach a root inode specifying the file name for the file that is identified as being different between the pair of snapshots.

Each instance of the snapshot difference interface 810 may maintain checkpoints that can be used to resume from a progress point captured by a checkpoint.

As the instances of the snapshot difference interface 810 finish, the interface deployer 806 deconstructs the instances of the snapshot difference interface 810 to conserve resources. In this way, the instances of the snapshot difference interface 810 can be spun up or down (created/deconstructed) in a resource conservative manner. The differences determined by the instances of the snapshot difference interface 810 are be combined as the difference 814 that is provided to the application 802 as a response to the request 804.

Figure 9A:
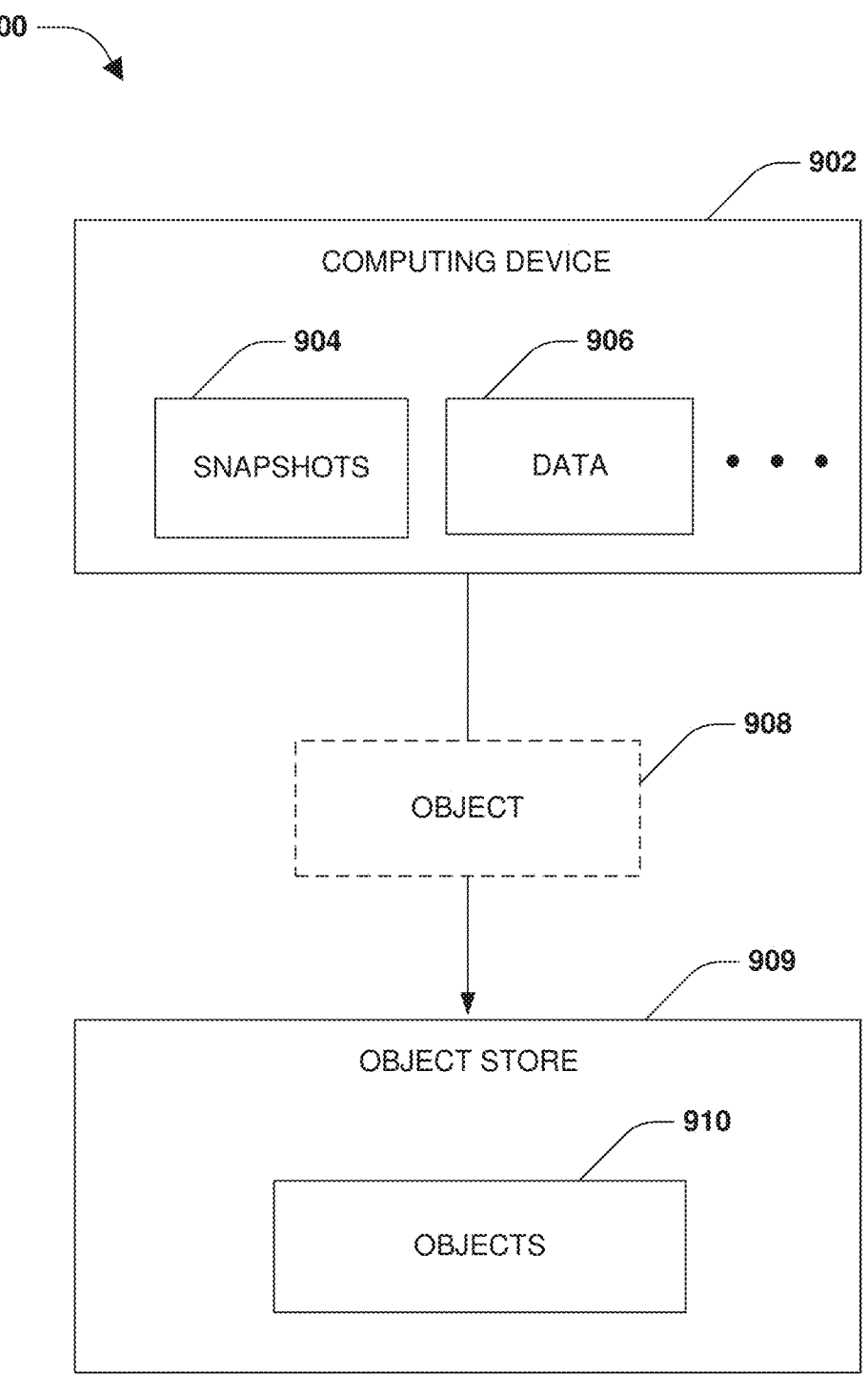
FIG. 9A is a component block diagram illustrating an example system for managing objects within an object store using an object file system.
Figure 9B:
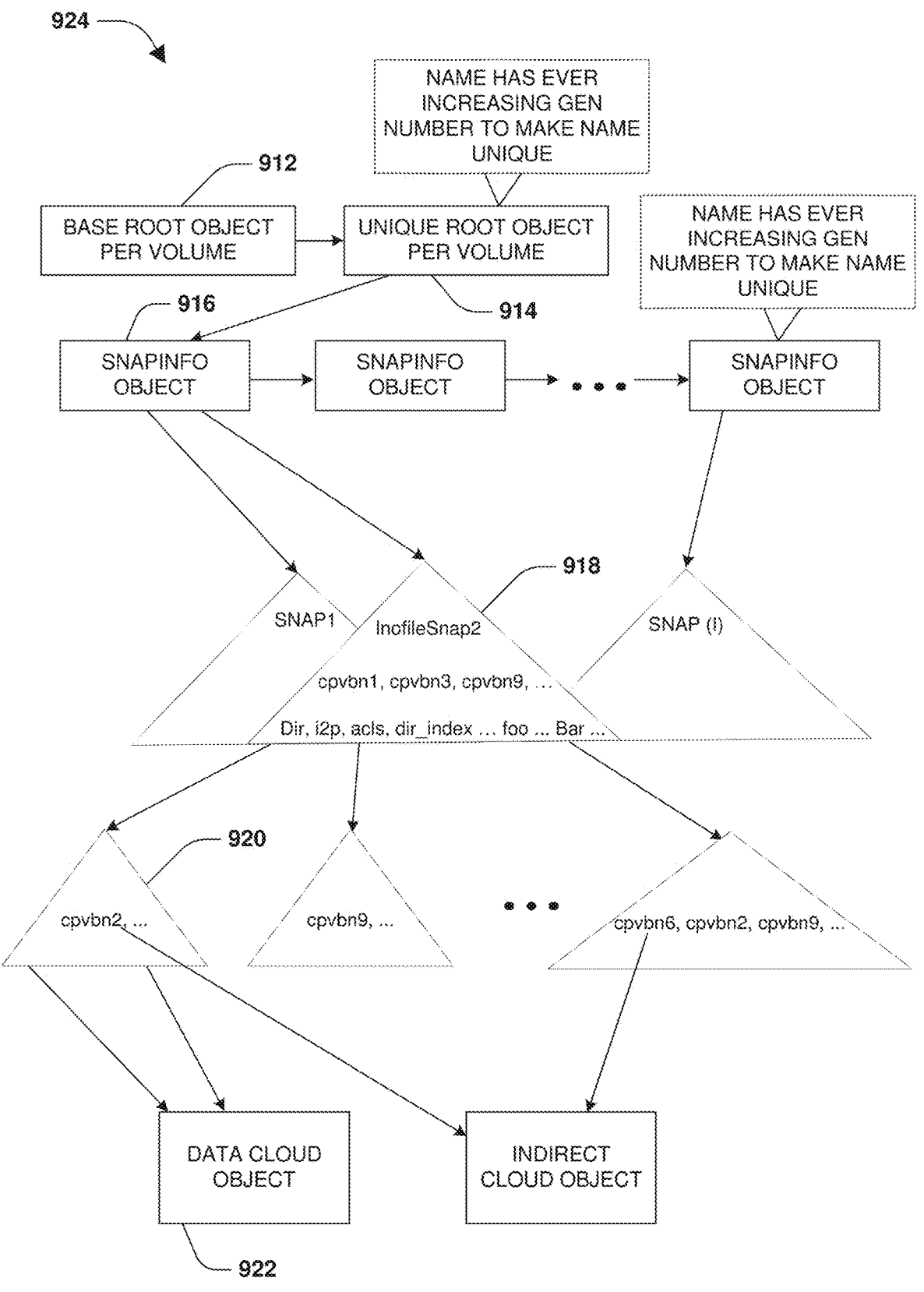
FIG. 9B is an example of a snapshot file system within an object store.
Figure 9C:
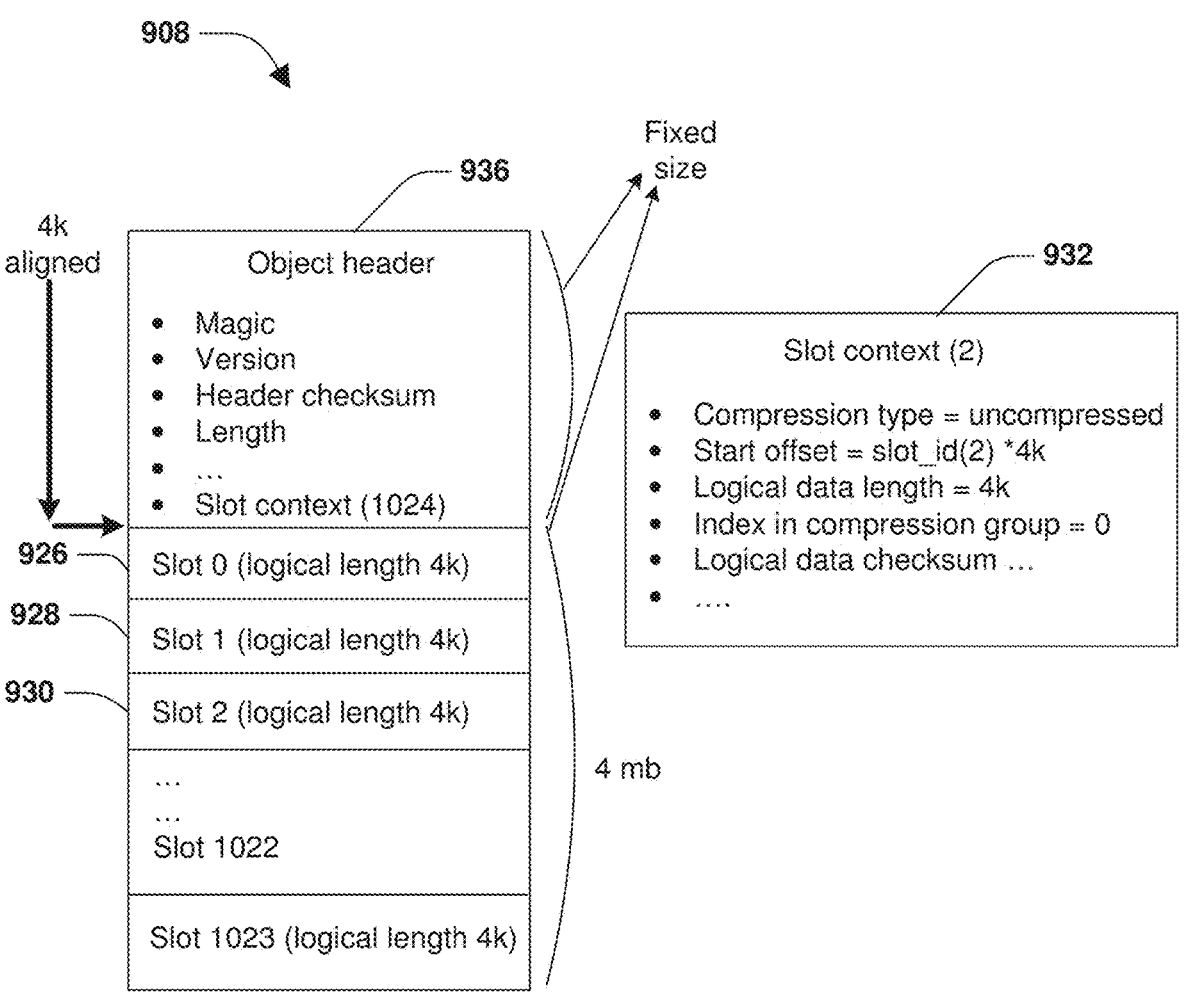
FIG. 9C is an example of an object stored within an object store.

FIG. 9A illustrates a system 900 for managing objects within an object store (a remote object store) using an object file system. The objects may store snapshot data of snapshots that can be restored on-demand to an on-demand volume using a restore process (e.g., an on-demand restore process) such that clients are provided with access to the snapshot data during and before completion of the restore process. A computing device 902 may comprise a node, a storage controller, a storage service, an on-premises computing device, a storage virtual machine, or any other hardware or software. The computing device 902 may store data 906 within storage devices (primary storage) managed by the computing device 902. The computing device 902 may provide client devices with access to the data 906, such as by processing read and write operations from the client devices. The computing device 902 may create snapshots 904 of the data 906, such as a snapshot of a file system of a volume accessible to the client devices through the computing device 902. The computing device 902 may be configured to communicate with an object store 909 over a network. The object store 909 may comprise a cloud computing environment remote to the computing device 902.

As provided herein, an object file system and object format is provided for storing and accessing data, such as snapshots, stored within objects in the object store 909. The data 906, maintained by the computing device, is stored into a plurality of slots of an object 908. Each slot represents a base unit of data of the object file system defined for the object store 909. For example, the object 908 comprises or any other number of slots (e.g., 1024 slots), wherein each slot comprises 9 kb of data or any other amount of data. It may be appreciated that objects may comprise any number of slots of any size. User data, directory blocks, metadata, and/or inofile blocks of an inofile comprising per inode metadata is stored into the slots of the object 908. In some embodiments, snapshot data, of a snapshot created by the computing device 902 of a file system maintained by the computing device 902, is stored into the object 908. For example, the object 908 may be maintained as an independent logical representation of the snapshot, such that data of the snapshot is accessible through the object 908 without having to reference other logical copies of other snapshots stored within objects 910 of the object store 909. In some embodiments, the data is converted from physical data into a version independent format for storage within the object 908.

In some embodiments, the object 908 is created to comprise data in a compressed state corresponding to compression of the data within the primary storage of the computing device 902. In this way, compression used by the computing device 902 to store the data is retained within the object 908 for storage within the object store 909. The object 908 may be assigned a unique sequence number. Each object within the object store 909 is assigned unique sequence numbers.

An object header may be created for the object 908. The object header comprises a slot context for slots within the object 908. The slot context may comprise information relating to a type of compression used for compressing data within the object 908 (if any compression is used), a start offset of a slot, a logical data length, a compressed data length, etc. The slot context may be used to access compressed data stored within the object 908.

FIG. 9C illustrates an example of the object 908. The object 908 comprises an object header 936 and a plurality of slots, such as a slot 926, a slot 928, a slot 930, and/or any other number of slots. The object header 936 may have a size that is aligned with a start of the plurality of slots, such as having a 9 kb alignment based upon each slot having a logical length of 9 kb. It may be appreciated that slots may have any length. The object header 936 comprises various information, such as a version identifier, a header checksum, a length of the object 908, a slot context 932, and/or other information used to access and manage data populated into the slots of the object 908.

The slot context 932 comprises various information about the slots, such as a compression type of a slot (e.g., a type of compression used to compress data of slots into a compression group or an indicator that the slot does not comprise compressed data), a start offset of the slot within the object 908 (e.g., a slot identifier multiplied by a slot size, such as 9 kb), a logical data length of the slot (e.g., 9 kb), a compressed length (e.g., 0 if uncompressed), an index of the slot within a compression group of multiple slots (e.g., 0 if uncompressed), a logical data checksum, etc.

The data stored within the slots of the object 908 are represented as a data structure (e.g., a structure that is traversable by a data connector component). The data structure may comprise a tree structure or any other type of structure. For example, the data structure comprises the tree structure representing a file. The data structure may be populated with a plurality of nodes at various levels of the tree structure. The nodes may be represented by cloud block numbers. A cloud block number of a node may comprise a sequence number used to uniquely identify the object 908 and/or a slot number of a slot comprising a portion of the data represented by the node. User data, directory blocks, metadata, inofile blocks of an inofile, and/or other data stored within the slots of the object 908 may be represented by nodes within the data structure. In some embodiments, user data is stored within leaf nodes of the data structure (e.g., nodes within a level 0 (L0) level of the tree structure). Pointers (indirects) may be stored within non-leaf nodes of the data structure (e.g., nodes within a level 1 (L1), a level 2 (L2), and/or other levels of the tree structure). An inode object for the file may comprise pointers that point to non-leaf nodes within a top level of the data structure.

In some embodiments of the tree structure, a 1 TB file may be represented by the tree structure. An inode of the file may comprise metadata and/or a flat list of 4845 pointers or any other number of pointers to nodes within a level 2 of the tree structure (e.g., there are 4845 nodes (4 kb blocks) within the level 2 of the tree structure). The level 2 comprises the 4845 nodes (4 kb blocks), each having 255 pointers or any other number of pointers to nodes within a level 1 of the tree structure (e.g., there are 980393 (4 kb blocks) within the level 1 of the tree structure. The level 1 comprises the 980393 (4 kb blocks), each having 255 pointers to nodes within a level 0 of the tree structure. The level 0 comprises 250,000,000 nodes (4 kb blocks) representing actual data, such as user data.

FIG. 9B illustrates a snapshot file system of data structures 924 (e.g., a tree structure that can be traversed by a data connector component) used to represent snapshots (e.g., snapshots of one or more volumes managed by the computing device 902) stored into the objects 910 of the object store 909. There is one base root object per volume, such as a base root object 912 for a volume of which the snapshots were captured. There is a unique root object per volume, such as a unique root object 914 for the volume. The base root object 912 may point to the unique root object 914. Names of the unique root objects may be derived from increasing generation numbers. The unique root object 914 may point to snapinfo objects, such as a snapinfo object 916 comprising information regarding one or more snapshots, such as a pointer to an inofile 918 of a second snapshot of the volume. The inofile 918 comprises cloud block numbers of slots within an object comprising data of the second snapshot, such as a pointer to an indirect 920 that points to data 922 of the snapshot. The inofile 918 may comprise or point to information relating to directories, access control lists, and/or other information.

A mapping metafile (a VMAP) is maintained for the object 908. The mapping metafile maps block numbers of primary storage of the computing device 902 (e.g., virtual volume block numbers of the data stored into slots of the object 908) to cloud block numbers of nodes representing portions of the data stored within the slots of the object 908. The object 908 is stored within the object store 909. In some embodiments of storing objects into the object store 909, the plurality of snapshots 904, maintained by the computing device 902, are stored within objects 910 of the object store 909. Each snapshot is identifiable through a snapinfo object that has a unique generation number. As will be described later, the objects 910 within the object store 909 may be deduplicated with respect to one another (e.g., the object 908 is deduplicated with respect to the object 910 using the mapping metafile as part of being stored into the object store 909) and retain compression used by the computing device 902 for storing the snapshots 904 within the primary storage.

The mapping metafile and/or the data structure are used to provide access through the object file system to portions of data within the slots of the object 908 in the object store 909. In some embodiments, the inode object and the data structure are traversed to identify a sequence number and slot number of requested data. The sequence number and the slot number are used to access the requested data within a corresponding slot of the object 908. In some embodiments, a read request targets a 100,000th level 0 block stored within the object 908. The inode object is read to calculate which blocks in each level of the data structure will have 100,000 (e.g., 100,000/255 is a 493th block in level 1 and 493/255 is a 2nd block in level 2). These blocks are read at each level to go to a next level through appropriate pointers (e.g., cloud block numbers) until the data is read from a block of user data within the level 0. The pointers are cloud block numbers, where a pointer comprises a sequence number of the object 908 and a slot number. The sequence number corresponds to an object name of the object 908 and the slot number is which slot the data is located within the object 908.

In an embodiment, an on-demand restore of data within a snapshot stored within objects of the object store 909 can be performed to a target computing device using the mapping metafile and/or the data structure. In an embodiment, the mapping metafile and/or the data structure may be used to free objects from the object store 909 based upon the objects comprising snapshot data of snapshots deleted by the computing device 902.

In an embodiment, the mapping metafile and/or an overflow mapping metafile are used to facilitate the copying of the snapshots to the object store 909 in a manner that preserves deduplication and compression, logically represents the snapshots as fully independent snapshots, and provides additional compression. In particular, the mapping metafile is populated with entries for block numbers (e.g., virtual volume block numbers, physical volume block numbers, etc. used by the node to reference data such as snapshot data stored by the node) of the snapshots 904 maintained by the computing device 902 and copied into the objects 910 of the object store 909 as copied snapshots. An entry within the mapping metafile is populated with a mapping between a block number of data within a snapshot at the computing device 902 (e.g., a virtual volume block number) and a cloud block number (e.g., a cloud physical volume block number) of a slot within an object into which the data was copied when the snapshot was copied to the object store 909 as a copied snapshot. The entry is populated with a compression indicator to indicate whether data of the block number is compressed or not (e.g., a bit set to a first value to indicate a compressed virtual volume block number and set to a second value to indicate a non-compressed virtual volume block number).

The entry is populated with a compression group start indicator to indicate whether the block number is a starting block number for a compression group of a plurality of block numbers of compressed data blocks. The entry is populated with an overflow indicator to indicate whether the data block has an overflow entry within the overflow mapping metafile. The overflow mapping metafile may comprise a V+ tree, such as a special B+ tree with support for variable length key and payload so a key can be sized according to a type of entry being stored for optimization. The key uniquely represents all types of entries associated with a block number (a virtual volume block number). The key may comprise a block number field (e.g., the virtual volume block number of a data block represented by the block number or a starting virtual volume block number of a first data block of a compression group comprising the data block), a physical length of an extent of the data block, if the corresponding entry is a start of a compression group, and other block numbers of blocks within the compression group. The payload is a cloud block number (a cloud physical volume block number). The entry may be populated with a logical length of an extent associated with the block number. The entry may be populated with a physical length of the extent associated with the block number.

The mapping metafile and/or the overflow mapping metafile may be indexed by block numbers of the primary storage (e.g., virtual volume block numbers of snapshots stored by the computing device 902 within the primary storage, which are copied to the object store as copied snapshots). In some embodiments, the block numbers may correspond to virtual volume block numbers of data of the snapshots stored by the computing device 902 within the primary storage. In some embodiments, a block number corresponds to a starting virtual volume block number of an extent of a compression group.

The mapping metafile and/or the overflow mapping metafile is maintained according to a first rule specifying that the mapping metafile and/or the overflow mapping metafile represent a comprehensive set of cloud block numbers corresponding to a latest snapshot copied to the object. The mapping metafile and/or the overflow mapping metafile is maintained according to a second rule specifying that entries within the mapping metafile and/or the overflow mapping metafile are invalidated based upon any block number in the entries being freed by the computing device 902.

The mapping metafile and/or the overflow mapping metafile is used to determine what data of the current snapshot is to be copied to the object store 909 and what data already exists within the object store 909 so that only data not already within the object store 909 is transmitted to the object store 909 for storage within an object. Upon determining that the current snapshot is to be copied to the object store 909, an invalidation phase is performed. In particular, a list of deallocated block numbers of primary storage of the computing device 902 (e.g., virtual volume block numbers, of the file system of which snapshots are created, that are no longer being actively used to store in-use data by the node) are determined based upon a difference between a first snapshot and a second snapshot of the primary storage (e.g., a difference between a base snapshot and an incremental snapshot of the file system). As part of the invalidation phase, entries for the list of deallocated block numbers are removed from the mapping metafile and/or the overflow mapping metafile.

After the invalidation phase, a list of changed block numbers corresponding to changes between the current snapshot of the primary storage being copied to the object store 909 and a prior copied snapshot already copied from the primary storage to the object store 909 is determined. The mapping metafile is evaluated using the list of changed block numbers to identify a deduplicated set of changed block numbers without entries within the mapping metafile. The deduplicated set of changed block numbers correspond to data, of the current snapshot, not yet stored within the object store 909.

An object is created to store data of the deduplicated set of changed block numbers. The object comprises a plurality of slots, such as 1024 or any other number of slots. The data of the deduplicated set of changed block numbers is stored into the slots of the object. An object header is updated with metadata describing the slots. In some embodiments, the object is created to comprise the data in a compressed state corresponding to compression of the data in the primary storage. The object can be compressed by combining data within contiguous slots of the object into a single compression group. In this way, compression of the current snapshot maintained by the node is preserved when the current snapshot is stored in the object store as the object corresponding to a copy of the current snapshot.

The object, comprising the data of the deduplicated set of changed block numbers, is transmitted to the object store 909 for storage as a new copied snapshot that is a copy of the current snapshot maintained by the node. The object is stored as a logical copy of the current snapshot. Also, additional compression is applied to this logical data, and information used to uncompress the logical data is stored in the object header. Further, the object is maintained as an independent logical representation of the current snapshot, such that copied data, copied from the current snapshot, is accessible through the object without having to reference other logical copies of other copied snapshots stored in other objects within the object store 909. Once the object is stored within the object store 909, the mapping metafile and/or the overflow mapping metafile is updated with entries for the deduplicated set of changed block numbers based upon receiving an acknowledgment of the object being stored by the object store 909. An entry will map a changed block number to a cloud block number of a slot within which data of the changed block number is stored in the object.

In an embodiment, the object file system is used to provide various primary storage system services for the object store 909 in order to achieve efficient space and resource management, and flexible scaling in the object store 909 (e.g., a cloud computing environment). Additionally, pseudo read only snapshots are provided through the object store 909. Consumers of these snapshots may choose to derive just the logical data represented by these snapshots or can additionally derive additional metadata associated with the logical data if required. This additional metadata is created post snapshot creation and hence is not directly part of logical view of the snapshot. The present system provides flexible, scalable, and cost effective techniques for leveraging cloud storage for off-premises operations on secondary data, such as analytics, development testing, virus scan, load distribution, etc. Objects may be modified (e.g., a unit of storage within a cloud storage environment) without changing the meaning or accessibility of useable data in the objects (e.g., a cloud object comprising a snapshot copy of primary data maintained by the computing device 902). Objects may be modified to add additional metadata and information such as analytics data, virus scan data, etc. to useable data without modifying the useable data. Thus, an object is maintained as a pseudo read only object because in-use data is unmodifiable while unused or freed data is modifiable such as by a defragmentation and/or garbage collection process.

Changes in objects can be detected in order to resolve what data of the objects is the correct data. The present system provides the ability to perform defragmentation and garbage collection for objects by a cloud service hosted by the object store 909, such as a cloud storage environment. Defragmentation and garbage collection are provided without affecting access to other in-use data within objects (e.g., in-use snapshot data stored within an object that is used by one or more applications at various remote computers). This allows for more true distributed and infinite scale data management. The present system provides for the ability to run analytics on objects (e.g., read/write analytics of data access to data within an object) using analytic applications hosted within the cloud storage environment. The analytics can be attached to objects even though the objects are read only. The present system provides for deduplication of objects. In this way, objects can be modified while still maintaining consistency of in-use data within the objects (e.g., maintaining consistency of a file system captured by a snapshot that is stored within an object) and without compromising a read only attribute of the objects. Also, computationally expensive processes like garbage collection, analytics, and defragmentation are offloaded from on-premises primary storage systems, such as the computing device 902, to the object store 909 such as cloud services within the cloud storage environment.

In one embodiment, objects within the object store 909 (e.g., objects within a cloud computing environment) can be maintained with a read only attribute such that data within objects can be overwritten/modified/freed so long as in-use data within the objects is not altered. In particular, an object may be maintained within the object store 909, such as a cloud computing environment. The object comprises a plurality of slots, such as 1024 or any other number of slots. Each slot is used to store a unit of data. The data within each slot is read-only. In particular, the data is read only when in-use, such as where one or more applications are referencing or using the data (e.g., an application hosted by the computing device 902 is storing data of a snapshot of a local file system within a slot of an object, and thus the snapshot data is in-use until a particular event occurs such as the computing device 902 deleting the snapshot). In some embodiments, the object comprises snapshot data of a file system, a volume, a logical unit number (LUN), a file, or any other data of the computing device 902. In this way, the object comprises a read only snapshot of data of the computing device 902. In one example, a plurality of objects corresponding to read only snapshots of the file system of the computing device 902 are stored within the object store 909. Each object is assigned a unique sequence identifier.

A first rule is enforced for the object. The first rule specifies that in-use slots are non-modifiable and unused slots are modifiable. An in-use slot is a slot that stores data actively referenced, used, and/or maintained by a computing device 902 (a primary storage system). For example, an in-use slot may be a slot that comprises snapshot data (e.g., secondary/replicated data) of a snapshot created by a computing device 902. The slot becomes an unused slot when the data is no longer actively referenced, used, and/or maintained, such as where the computing device 902 deletes the snapshot. Thus, if a slot is in-use, then the data within the slot cannot be modified. Otherwise, data in unused slots (e.g., stale data that is no longer referenced or used) can be modified, such as deleted/freed by garbage collection functionality or defragmentation functionality.

Additional information for the object may be generated. The additional information may comprise analytics (e.g., read/write statistics of access to the object), virus scan information, development testing data, and/or a variety of other information that can be generated for the object and the data stored therein. In some embodiments, the additional data is generated by a cloud service or application executing within the cloud computing environment. This will offload processing and resource utilization that would otherwise be used by the computing device 902 (primary storage system) to perform such analytics and processing.

Metadata of the additional information is attached to an object header of the object. The object header is used to store metadata for each slot of the object. In one example, the metadata specifies a location of the additional information within the object, such as a particular slot into which the additional information is stored. In another example, the metadata may comprise the additional information, and thus the additional information is stored into the object header. The metadata is attached in a manner that does not change a meaning or accessibility of useable data within in-use slots of the object. In particular, applications that are allowed to merely access user data within the object (e.g., the applications are unaware or have no reason to access the additional information) are provided with only access to the user data and are not provided with access to the metadata or additional information. Thus, these applications continue to access user data within the object in a normal manner. For application that are allowed to access both the user data and the additional information, those applications are provided with access to the user data and the metadata for identifying and accessing a location of the additional information within the object. The first rule is enforced such that user data (in-use data) is retained in an unmodified state within the object notwithstanding the metadata and/or additional information being associated with the object.

In some embodiments, a second rule is enforced for the object. The second rule specifies that related read operations are to be directed to a same version of an object. For example, an object corresponds to secondary/replicated snapshot data of a file system maintained by the computing device 902. Each time a new snapshot of the file system is created, a new version of the object is created to capture changes to the file system. In another example, since in-use data within the object is read only and unmodifiable, any modifications to slots with in-use data will result in a new version of the object being created with the modified data.

If multiple read operations are related, then those read operations should be executed upon the same version of the object for data consistency purposes. This is achieved by comparing timestamp data of the related read operations. If the timestamp data between the related read operations is mismatched, then the related read operations are retried because the related read operations were executed upon different versions of the same object. If the timestamp data between the read operations matches, then the related read operations are considered successful. In some embodiments, a first related read operation reads the object header of the object to identify a slot from which data is to be read. A second related read operation is executed to read data from the slot. The two related read operations should be executed upon the same version of the object/slot (e.g., the operations can be executed upon different versions such as where data of a current version of the object is modified between execution of the operations, thus creating a new version of the object with the modified data since the object is read only and the original data is unmodifiable within the current version of the object). Thus, timestamp data of the two related read operations is used to determine whether the two related read operations were executed upon the same version of the object/slot and thus should be considered complete or should be retried.

In one embodiment, garbage collection is provided for objects within the object store 909. The objects have a read only state, such that enforcement of the first rule ensures that in-use data within slots of an object is not modifiable, thus making objects pseudo read only objects because only unused slots can be modified/freed of unused data. In some embodiments, an object is used to store data of a snapshot of a file system hosted by the computing device 902. The snapshot may be determined as being deleted by the computing device 902, and thus slots comprising snapshot data of the deleted snapshot are now considered to be unused slots as opposed to in-use slots.

Each snapshot of the file system may be associated with a bitmap that identifies objects within the object store that correspond to a particular snapshot. Thus, the bitmaps can be evaluated to identify what objects comprise data of particular snapshots. For example, a bitmap of the deleted snapshot can be used to identify the object and other objects as comprising data of the deleted snapshot.

A garbage collection operation is executed to free objects (e.g. free unused data from unused slots) from the object store in order to reduce storage utilization of the object store that would otherwise be unnecessarily used to store stale/unused data. In some embodiments, the garbage collection operation is executed by a cloud service in order to conserve resource consumption by the computing device 902 (primary storage system) otherwise used to execute the garbage collection operation. The garbage collection operation free objects from the object store 909 based upon the objects uniquely corresponding to deleted snapshots. That is, if an object stores data of only deleted snapshots and does not store data of active/undeleted snapshots, then the garbage collection process can free/delete that object. For example, the bitmaps describing objects within the object store 909 that are related to snapshots of the file system are evaluated to determine whether the object is unique to the deleted snapshot and/or unique to only deleted snapshots (e.g., the object does not comprise data of active/undeleted snapshots). If so, then the object is freed from the object store 909. However, if the object is not unique to only deleted snapshot(s) such as where the object also stores data of an active/undeleted snapshot, then the object is not freed.

In an embodiment, defragmentation is provided for fragmented objects within the object store 909. In some embodiments, defragmentation is implemented by a cloud service or application executing in the object store 909 in order to conserve resources otherwise used by a computing device 902 (primary storage system) that would execute defragmentation functionality. An object within the object store 909 is determined to be a fragmented object based upon the object comprising at least one freed slot from which data was freed. For example, a freed slot may comprise an unused slot comprising unused data no longer referenced/used by the computing device 902 (e.g., data of a deleted snapshot). Accordingly, the fragmented object may comprise one or more in-use slots of in-use data currently referenced/used by a computing device 902 and one or more freed slots of freed data (e.g., unused slots comprising unused data).

The fragmented object is compacted to retain the in-use data and exclude the freed data (the unused data) as a written object. Because compacting may store the in-use data in new slots, an object header of the object is updated with new locations of the in-use data within the rewritten object. In this way, defragmentation is performed for objects within the object store 909.

The present system preserves deduplication and compression used by the computing device 902 for snapshots when storing copied snapshots to the object store 909 notwithstanding copied snapshots representing fully logical copies of data in the primary storage of the computing device 902. In particular, deduplication is preserved because data that is shared in a snapshot (e.g., a local or primary snapshot created and maintain by the node) is also shared in a copied snapshot in the object store 909. Deduplication of compression groups is maintained while logically representing the compression groups in a copied snapshot. Block sharing across multiple snapshots is also preserved so that merely changed blocks are transferred/copied to the object store 909 during incremental snapshot transfers.

Additional compression may be provided for a snapshot data copy. In particular, larger compression groups provide more space efficiency but with less read efficiency compared to smaller compression groups. Relatively smaller compression groups may be used by the computing device 902 of the storage system since access to the primary storage of the computing device 902 may be more read intensive, and thus read efficiency is prioritized over storage space efficiency. Because copied snapshots in the object store 909 are infrequently accessed (e.g., cold data that is infrequently read), relatively larger compression groups can be employed for improved storage space efficiency within the object store, which also reduces network bandwidth for snapshot copying to the object store 909.

In one embodiment, snapshots maintained by the computing device 902 are copied to the object store 909 as copied snapshots representing logical data of the snapshots. Data of the copied snapshots is stored into slots of objects that are deduplicated with respect to other objects stored within the object store 909 and retain compression used by the computing device 902 for the snapshots.

In some embodiments, the computing device 902 stores data within primary storage. The computing device 902 may create snapshots of the data stored by the computing device 902. For example, the computing device 902 may create a snapshot of a file, a logical unit number, a directory, a volume, a storage virtual machine hosting a plurality of volumes, a file system, a consistency group of any arbitrary grouping of files, directories, or data, etc. The computing device 902 may deduplicate data between the snapshots so that instead of storing redundant data blocks multiple times, merely references are stored in place of the redundant data blocks and point to original data blocks with the same data. The computing device 902 may compress data within the snapshots, such as by creating compression groups of compressed data blocks.

The mapping metafile and/or the overflow mapping metafile is used to determine what data of the current snapshot is to be copied to the object store 909 and what data already exists within the object store so that only data not already within the object store is transmitted to the object store 909 for storage within an object. Upon determining that the current snapshot is to be copied to the object store, an invalidation phase is performed. In particular, a list of deallocated block numbers of primary storage of the computing device 902 (e.g., virtual volume block numbers, of the file system of which snapshots are created, that are no longer being actively used to store in-use data by the node) are determined based upon a difference between a first snapshot and a second snapshot of the primary storage (e.g., a difference between a base snapshot and an incremental snapshot of the file system). As part of the invalidation phase, entries for the list of deallocated block numbers are removed from the mapping metafile and/or the overflow mapping metafile.

In some embodiments, a system is provided. The system comprises: an orchestrator building a catalog of snapshots stored within an object store, wherein snapshot data of the snapshots is stored within objects according to an object format and snapshot file system; and an object store data management container within which a snapshot difference interface configured to interpret the object format is integrated, wherein the snapshot difference interface: receives a request from the orchestrator for snapshot differences amongst a first snapshot and a second snapshot in the object store; traverses a first snapshot file system of the first snapshot and a second snapshot file system of the second snapshot while the first snapshot and the second snapshot are stored within the object store to determine the snapshot differences; and transmits the snapshot differences to the orchestrator for building the catalog.

In some embodiments, the snapshot difference interface generates checkpoints while identify a set of snapshot differences amongst a set of snapshots, and wherein a checkpoint is utilized by the snapshot difference interface to resume processing of the set of snapshots from a progress point of the processing captured by the checkpoint.

In some embodiments, the snapshot different interface is configured to transmit batches of snapshot differences to the orchestrator.

In some embodiments, the snapshot difference interface processes a subsequent request for identifying snapshot differences between a first pair of snapshots from a point where a prior request for identify snapshot differences between a second pair of snapshots left off. That is, checkpointing may be performed where checkpoints are created as part of identifying snapshot differences between pairs of snapshots. If there is a failure during processing of the prior request and a subsequent request is received, then a checkpoint from the prior request is used for the subsequent request so that processing already performed and captured by the checkpoint is not re-performed. For example, an orchestrator is building a catalog of snapshots stored in an object store based upon differences between the snapshots. The orchestrator sends a first request (the prior request) to a first instance of the snapshot difference interface. The first request (the prior request) is requesting the differences between the snapshots. While the first instance of the snapshot difference interface is processing the first request (the prior request), checkpoints are created to track what differences have already been identified. The first instance of the snapshot difference interface may fail before completion. Accordingly, a second instance of the snapshot difference interface is created. The second instance of the snapshot difference interface uses the checkpoint to determine what differences were already identified by the first instance of the snapshot difference interface before the failure. So, when the orchestrator transmits a subsequent request for the differences (because there was a failure and the orchestrator never received all the differences), the second instance of the snapshot difference interface uses the checkpoint to resume processing from where the first instance of the snapshot difference interface left off before the failure so that the already previously identified differences (identified by the first instance of the snapshot difference interface) are not again identified, and the second instance of the snapshot difference interface merely identifies the differences that the first instance of the snapshot difference interface never identified.

In some embodiments, the orchestrator displays the catalog through a user interface for browsing snapshots, versions of files captured by the snapshots, versions of metadata captured by the snapshots, and versions of directories captured by the snapshots.

In some embodiments, the orchestrator displays the catalog through a user interface for browsing snapshots, and wherein the orchestrator visually modifies the display of the catalog in response to user input navigating amongst content of the snapshots represented within the catalog.

In some embodiments, the orchestrator displays the catalog through a user interface for browsing snapshots, and wherein the orchestrator facilitates a restore operation of a version of a file captured by one or more snapshots within the object store based upon user input through the catalog used to select the version of the file to restore.

In some embodiments, the snapshot difference interface performs a difference operation upon an inofile root to obtain file block numbers representing blocks of changed inodes between the first snapshot and the second snapshot.

In some embodiments, the snapshot difference interface reads the blocks represented by the file block numbers and performs difference operations on the blocks to identify inodes that are different.

In some embodiments, the snapshot difference interface reads a set of the inodes from the first snapshot and the second snapshot to identify inodes that are different, and wherein for an inode with a link, traversing an inode to path to obtain changed link inodes.

In some embodiments, the snapshot difference interface constructs a file name by: perform a reverse lookup for an inode identified as different between the first snapshot and the second snapshot to obtain parent inode and an entry offset within the parent inode; and perform a traversal of parent inodes using entry offsets to reach a root inode specifying the file name.

In some embodiments, a method is provided. The method comprises initiating, by an orchestrator, a catalog build process to build a catalog of snapshots stored within an object store, wherein snapshot data of the snapshots is stored within objects according to an object format and snapshot file system; receiving, by a snapshot difference interface integrated into an object store data management container and configured to interpret the object format, a request from the orchestrator for snapshot differences amongst a first snapshot and a second snapshot in the object store; traversing a first snapshot file system of the first snapshot and a second snapshot file system of the second snapshot while the first snapshot and the second snapshot are stored within the object store to determine the snapshot differences; and transmitting the snapshot differences to the orchestrator for building the catalog.

In some embodiments, the method includes generating checkpoints while identify a set of snapshot differences amongst a set of snapshots; and utilizing a checkpoint by the snapshot difference interface to resume processing of the set of snapshots from a progress point of the processing captured by the checkpoint.

In some embodiments, the method includes transmitting batches of snapshot differences to the orchestrator.

In some embodiments, the method includes processing a subsequent request for identifying snapshot differences between a first pair of snapshots from a point where a prior request for identify snapshot differences between a second pair of snapshots left off.

In some embodiments, the method includes displaying the catalog through a user interface for browsing snapshots, versions of files captured by the snapshots, versions of metadata captured by the snapshots, and versions of directories captured by the snapshots.

In some embodiments, the method includes displaying the catalog through a user interface for browsing snapshots; visually modifying the display of the catalog in response to user input navigating amongst content of the snapshots represented within the catalog.

In some embodiments, the method includes displaying the catalog through a user interface for browsing snapshots; and facilitating a restore operation of a version of a file captured by one or more snapshots within the object store based upon user input through the catalog used to select the version of the file to restore.

In some embodiments, a non-transitory machine readable medium is provided. The non-transitory machine readable medium comprises instructions, which when executed by a machine, causes the machine to: initiate, by an orchestrator, a catalog build process to build a catalog of snapshots stored within an object store, wherein snapshot data of the snapshots is stored within objects according to an object format and snapshot file system; receive, by a snapshot difference interface integrated into an object store data management container and configured to interpret the object format, a request from the orchestrator for snapshot differences amongst a first snapshot and a second snapshot in the object store; traverse a first snapshot file system of the first snapshot and a second snapshot file system of the second snapshot while the first snapshot and the second snapshot are stored within the object store to determine the snapshot differences; and transmit the snapshot differences to the orchestrator for building the catalog.

In some embodiments, the instructions include generate checkpoints while identify a set of snapshot differences amongst a set of snapshots; and utilize a checkpoint by the snapshot difference interface to resume processing of the set of snapshots from a progress point of the processing captured by the checkpoint.

Figure 10:
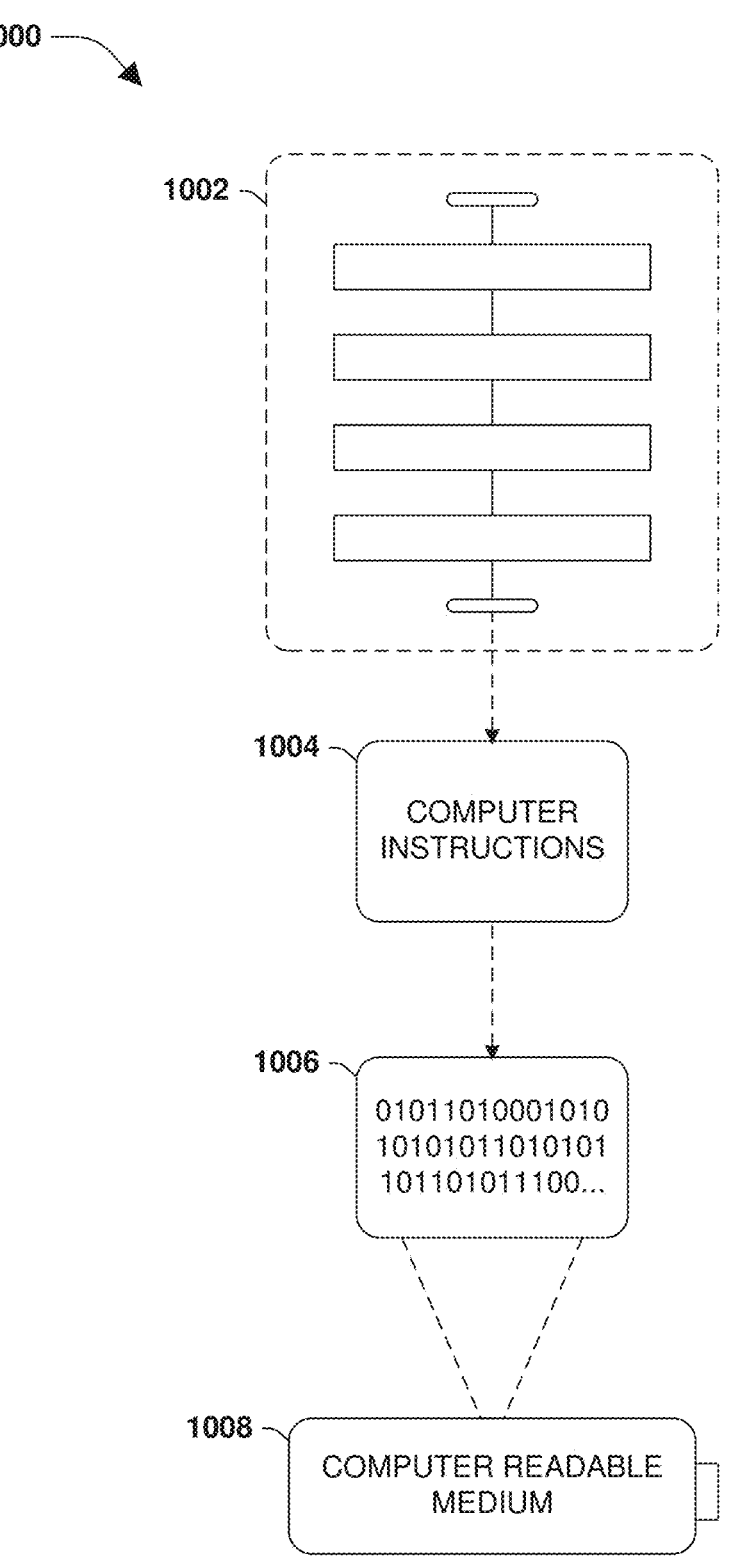
FIG. 10 is an example of a computer readable medium in which an embodiment of the present technology may be implemented.

Still another embodiment involves a computer-readable medium 1000 comprising processor-executable instructions configured to implement one or more of the techniques presented herein. An example embodiment of a computer-readable medium or a computer-readable device that is devised in these ways is illustrated in FIG. 10, wherein the implementation comprises a computer-readable medium 1008, such as a compact disc-recordable (CD-R), a digital versatile disc-recordable (DVD-R), flash drive, a platter of a hard disk drive, etc., on which is encoded computer-readable data 1006. This computer-readable data 1006, such as binary data comprising at least one of a zero or a one, in turn comprises processor-executable computer instructions 1004 configured to operate according to one or more of the principles set forth herein. In some embodiments, the processor-executable computer instructions 1004 are configured to perform a method 1002, such as at least some of the exemplary method 100 of FIG. 1, at least some of the method 700 of FIG. 7, for example. In some embodiments, the processor-executable computer instructions 1004 are configured to implement a system, such as at least some of the exemplary system 200 of FIG. 2, at least some of the exemplary system 300 of FIG. 3, at least some of the exemplary system 400 of FIG. 4, at least some of the exemplary system 500 of FIG. 5, at least some of the exemplary system 600 of FIG. 6A, for example. Many such computer-readable media are contemplated to operate in accordance with the techniques presented herein.

In an embodiment, the described methods and/or their equivalents may be implemented with computer executable instructions. Thus, in an embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (Saas) architecture, a smart phone, and so on. In an embodiment, a computing device is implemented with one or more executable algorithms that are configured to perform any of the disclosed methods.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), electrically erasable programmable read-only memory (EEPROM) and/or flash memory, compact disk read only memory (CD-ROM)s, CD-Rs, compact disk re-writeable (CD-RW)s, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:
1. A method, comprising:
receiving a request to identify differences between a set of snapshots stored within an object store of a cloud computing environment;
hosting a number of instances of a snapshot difference interface based upon properties of the set of snapshots;
processing pairs of snapshots by the instances of the snapshot difference interface, wherein each instance of the snapshot difference interface traverses snapshot file systems of a pair of snapshots to identify differences between the pair of snapshots for inclusion within the differences between the set of snapshots; and
combining differences between the pairs of snapshots identified by the instances of the snapshot difference interface as the differences between the set of snapshots to provide as a response to the request.
2. The method of claim 1, comprising:
constructing a catalog of the set of snapshots based upon the differences between the set of snapshots; and
providing the catalog to a requestor.
3. The method of claim 1, comprising:
constructing a catalog of the set of snapshots based upon the differences between the set of snapshots; and
displaying the catalog through a user interface for browsing snapshots.
4. The method of claim 1, comprising:
constructing a catalog of the set of snapshots based upon the differences between the set of snapshots; and
displaying the catalog through a user interface for browsing versions of files captured by the snapshots.
5. The method of claim 1, comprising:
constructing a catalog of the set of snapshots based upon the differences between the set of snapshots; and
displaying the catalog through a user interface for browsing versions of metadata captured by the snapshots.
6. The method of claim 1, comprising:
constructing a catalog of the set of snapshots based upon the differences between the set of snapshots; and
displaying the catalog through a user interface for browsing versions of directories captured by the snapshots.
7. The method of claim 1, comprising:
constructing a catalog of the set of snapshots based upon the differences between the set of snapshots;
displaying the catalog through a user interface for browsing snapshots; and
visually modifying the catalog in response to user input navigating amongst content of the snapshots represented within the catalog.
8. The method of claim 1, comprising:
constructing a catalog of the set of snapshots based upon the differences between the set of snapshots;
displaying the catalog through a user interface for browsing snapshots;
receiving user input through the catalog to select a version of a file to restore; and
performing a restore operation to restore the version of the file captured by one or more snapshots within the object store.
9. A non-transitory machine readable medium comprising instructions for performing a method, which when executed by a machine, causes the machine to perform operations comprising:
hosting a number of instances of a snapshot difference interface based upon properties of a set of snapshots for which differences are to be identified, wherein the snapshots are stored within an object store of a cloud computing environment;
processing pairs of snapshots by the instances of the snapshot difference interface, wherein each instance of the snapshot difference interface traverses snapshot file systems of a pair of snapshots to identify differences between the pair of snapshots for inclusion within the differences between the set of snapshots;
combining differences between the pairs of snapshots identified by the instances of the snapshot difference interface as the differences between the set of snapshots;
constructing a catalog of the set of snapshots based upon the differences between the set of snapshots; and
displaying the catalog through a user interface for browsing snapshots.

10. The non-transitory machine readable medium of claim 9, wherein the operations comprise:

displaying the catalog through the user interface for browsing versions of files captured by the snapshots.

11. The non-transitory machine readable medium of claim 9, wherein the operations comprise:

displaying the catalog through the user interface for browsing versions of metadata captured by the snapshots.

12. The non-transitory machine readable medium of claim 9, wherein the operations comprise:

displaying the catalog through the user interface for browsing versions of directories captured by the snapshots.

13. The non-transitory machine readable medium of claim 9, wherein the operations comprise:

visually modifying the catalog in response to user input navigating amongst content of the snapshots represented within the catalog.

14. The non-transitory machine readable medium of claim 9, wherein the operations comprise:

receiving user input through the catalog to select a version of a file to restore; and performing a restore operation to restore the version of the file captured by one or more snapshots within the object store.

15. A computing device comprising:

a memory storing instructions; and a processor coupled to the memory, the processor configured to execute the instructions to perform operations comprising:

hosting a number of instances of a snapshot difference based upon properties of a set of snapshots for which differences are to be identified, wherein the snapshots are stored within an object store of a cloud computing environment;

processing pairs of snapshots by the instances of the snapshot difference interface, wherein each instance of the snapshot difference interface traverses snapshot file systems of a pair of snapshots to identify differences between the pair of snapshots for inclusion within the differences between the set of snapshots;

combining differences between the pairs of snapshots identified by the instances of the snapshot difference interface as the differences between the set of snapshots; and providing the differences to a requestor.

16. The computing device of claim 15, wherein the operations comprise:

constructing a catalog of the set of snapshots based upon the differences between the set of snapshots; and providing the catalog to a requestor.

17. The computing device of claim 15, wherein the operations comprise:

constructing a catalog of the set of snapshots based upon the differences between the set of snapshots; and displaying the catalog through a user interface for browsing snapshots.

18. The computing device of claim 15, wherein the operations comprise:

constructing a catalog of the set of snapshots based upon the differences between the set of snapshots; and displaying the catalog through a user interface for browsing versions of files captured by the snapshots.

19. The computing device of claim 15, wherein the operations comprise:

constructing a catalog of the set of snapshots based upon the differences between the set of snapshots; and displaying the catalog through a user interface for browsing versions of metadata captured by the snapshots.

20. The computing device of claim 15, wherein the operations comprise:

constructing a catalog of the set of snapshots based upon the differences between the set of snapshots; and displaying the catalog through a user interface for browsing versions of directories captured by the snapshots.

* * * * *